US012614338B2

(12) United States Patent    (10) Patent No.: US 12,614,338 B2

Takahashi et al.    (45) Date of Patent:    Apr. 28, 2026

(54) INFORMATION PROCESSING DEVICE AND METHOD

(71) Applicant: Sony Group Corporation, Tokyo (JP)

(72) Inventors: Ryohei Takahashi, Tokyo (JP);
Mitsuhiro Hirabayashi, Tokyo (JP)

(73) Assignee: SONY GROUP CORPORATION,
Tokyo (JP)

( * ) Notice: Subject to any disclaimer, the term of this
patent is extended or adjusted under 35
U.S.C. 154(b) by 132 days.

(21) Appl. No.: 18/684,194

(22) PCT Filed: Sep. 22, 2022

(86) PCT No.: PCT/JP2022/035332

§ 371 (c)(1),
(2) Date: Feb. 16, 2024

(87) PCT Pub. No.: WO2023/054156

PCT Pub. Date: Apr. 6, 2023

(65) Prior Publication Data

US 2024/0221282 A1    Jul. 4, 2024

Related U.S. Application Data

(60) Provisional application No. 63/249,664, filed on Sep.
29, 2021.

(51) Int. Cl.
*G06T 15/04*    (2011.01)
*G06T 15/10*    (2011.01)
*G11B 20/10*    (2006.01)

(52) U.S. Cl.
CPC ............. *G06T 15/04* (2013.01); *G06T 15/10*
(2013.01); *G06T 2210/56* (2013.01); *G11B
20/10527* (2013.01)

(58) Field of Classification Search
CPC ..... G06T 15/04; G06T 2210/56; G06T 15/10;
G06T 9/00; H04N 21/44012;
(Continued)

(56) References Cited

U.S. PATENT DOCUMENTS 11,704,839 B2 * 7/2023 Kim ........................ G06T 15/04
345/423
11,721,064 B1 * 8/2023 Aksoy .................... G06N 20/00
345/418
(Continued)

FOREIGN PATENT DOCUMENTS

WO    2020/005363 A1    1/2020
WO    2020/185878 A1    9/2020
(Continued)

OTHER PUBLICATIONS

International Search Report and Written Opinion mailed on Dec. 6,
2022, received for PCT Application PCT/JP2022/035332, filed on
Sep. 22, 2022, 8 pages including English Translation.
(Continued)

*Primary Examiner* — Phi Hoang
(74) *Attorney, Agent, or Firm* — XSENSUS LLP

(57) ABSTRACT

The present disclosure relates to an information processing
device and method that enables simultaneous use of a
plurality of video components for one object using a scene
description. In an extension for the 3D object video defined
in a material layer of a scene description file, a component
index having a different value for each of video components
is set to a video component included in the 3D object video.
In addition, the video component is stored in a correspond-
ing buffer on the basis of the component index, the video
component is acquired from the buffer on the basis of the
component index, and a display image is generated using the
acquired video component. The present disclosure can be
(Continued)

applied to, for example, an information processing device, an information processing method, or the like.

20 Claims, 36 Drawing Sheets

(58) Field of Classification Search
CPC ........... H04N 21/21805; H04N 21/816; H04N 21/85406; G11B 20/10527
See application file for complete search history.

(56) References Cited

U.S. PATENT DOCUMENTS

| | | | | |
|---|---|---|---|---|
| 2003/0001948 A1* | 1/2003 | Mochizuki | ..... | H04N 21/234318 |
| | | | | 348/E7.071 |
| 2015/0215623 A1* | 7/2015 | Sanders | ................ | H04N 23/71 |
| | | | | 375/240.08 |
| 2021/0209829 A1* | 7/2021 | Ilola | ........................... | G06T 1/20 |
| 2022/0094941 A1* | 3/2022 | Kondrad | .......... | H04N 21/85406 |
| 2022/0398461 A1* | 12/2022 | Jaipuria | ............... | G06N 3/0455 |

FOREIGN PATENT DOCUMENTS

| | | | |
|---|---|---|---|
| WO | 2021/079592 A1 | 4/2021 | |
| WO | 2021/193213 A1 | 9/2021 | |
| WO | WO-2023137229 A1 | 7/2023 | |

OTHER PUBLICATIONS

ISO/IEC 14496-12_Information technology—Coding of audio-visual objects—Part 12: ISO base media file format sixth edition, pp. 1-326.

Bouazizi et al., "Attribute Registration for V3C", ISO/IEC JTC 1/SC 29/WG 3 m 57411, Jul. 2021, 1 page.

"Technologies under Consideration on Scene Description for MPEG Media", ISO/IEC JTC 1/SC 29/WG 03 N292, Aug. 17, 2023, pp. 1-58.

"Potential improvement of ISO/IEC DIS 23090-14 Scene Description for MPEG Media", ISO/IEC JTC 1/SC 29/WG 03 N0321, Aug. 17, 2023, pp. 1-74.

Bhatia et al., "MSFT_lod", Available Online at: https://github.com/KhronosGroup/glTF/blob/main/extensions/2.0/ Vendor/MSFT_lod/README.md, 4 pages.

Bhatia et al., "Khronos glTF2.0", Available Online at: https://github.com/KhronosGroup/glTF/tree/master/specification/2.0, Jun. 9, 2017, 111 pages.

"Technologies under Consideration on Scene Description for MPEG Media", ISO/IEC JTC1/SC 29/ WG 03, N292, MPEG Systems, Jul. 2021.

Chen Mengyu et al., "Simplified carriage of MPEG immersive video in HEVC bitstream", Proceedings of SPIE, vol. 11842, 2021, pp. 118420C-1-118420C9.

"Potential improvement on ISO/IEC 23090-14 Scene Description for MPEG Media", ISO/IEC JTC 1/SC 29/WG 03, N0119, MPEG Systems, Apr. 29, 2021, ISO 23090-14:2020(x).

* cited by examiner

```
{
  "scenes":[{"name":"Scene 1 ",[nodes":[0,1]},
             {"name":"Scene2","nodes": [2]},
  "nodes":[{"name":"Node1", "mesh":0, "camera":0, skin":0},
            {"name":"Node2 ", "mesh":1, "camera":1, skin":1},
            {"name":"Node3"}],
  "meshs":[{"primitives": [{
            "attributes": {"NORMAL": 23,"POSITION": 22,"TANGENT": 24,"TEXCOORD_0": 25},
            "indices": 21, "material": 3,"mode": 4}]
            :
            ]
  "cameras":[{....},
  "skins" :[{....},
  "materials" :[{....},
  "textures" :[{....},
            :
            :
  "scene": 0
}
```

*FIG. 6*

```
{
  "extensionsUsed":["ExtensionExample"]
   "extensionsRequired":["ExtensionExample"],
  "nodes":[
     {
        "name":"singleNode"
     }
  ],
   "scenes":[
     {
        "name":"singleScene",
        "nodes":[0],
        "extensions":{
              "ExtensionExample":{.....}
           }
        }
  ],
   "scene":0
}
```

*FIG. 9*

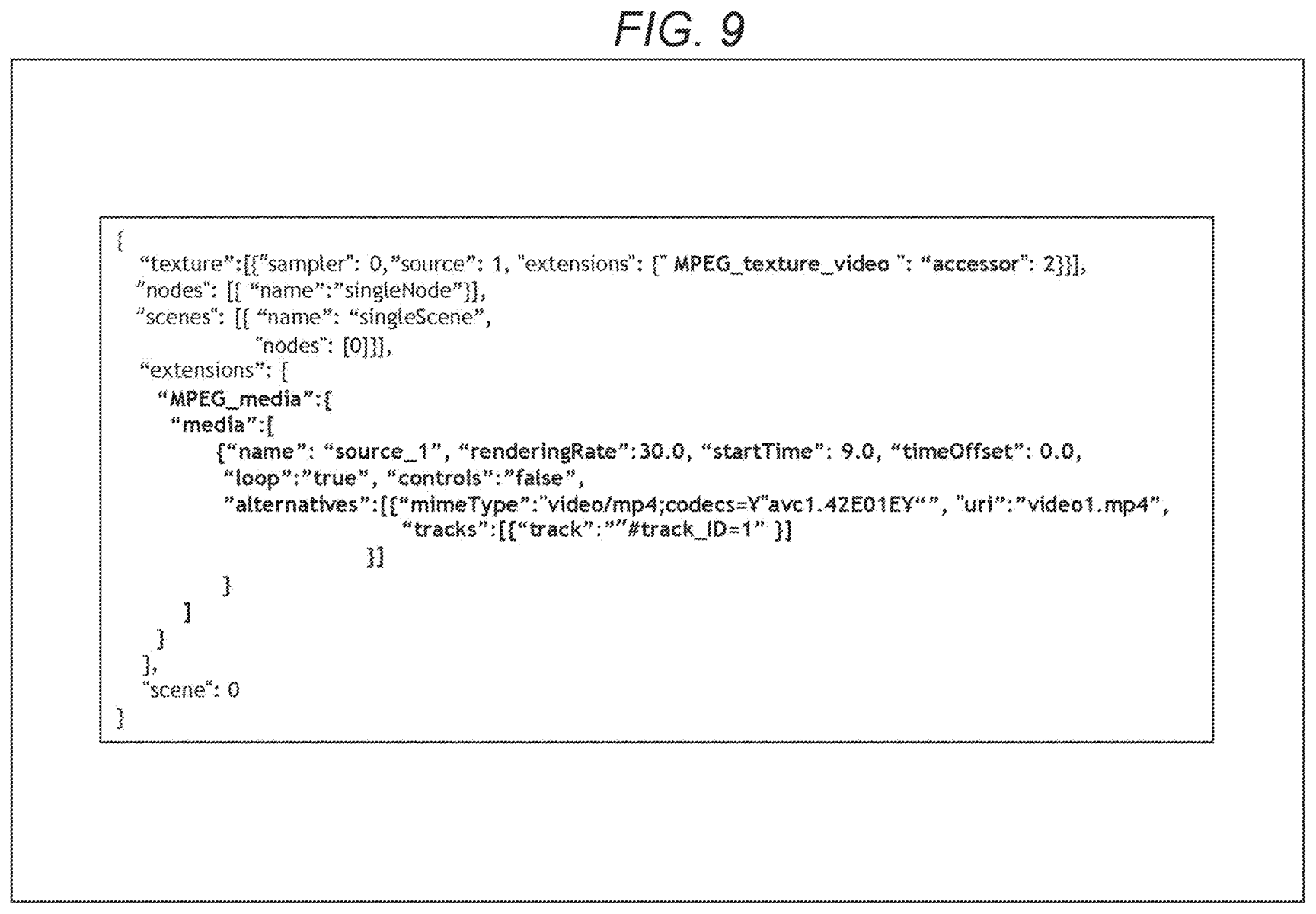

```
{
    "texture";[{"sampler": 0,"source": 1, "extensions": {" MPEG_texture_video "; "accessor": 2}}],
    "nodes"; [{ "name":"singleNode"}],
    "scenes": [{ "name": "singleScene",
            "nodes": [0]}],
    "extensions": {
        "MPEG_media":{
        "media":[
            {"name": "source_1", "renderingRate":30.0, "startTime": 9.0, "timeOffset": 0.0,
            "loop":"true", "controls":"false",
            "alternatives":[{"mimeType":"video/mp4;codecs=Y"avc1.42E01EY"", "uri":"video1.mp4",
                        "tracks":[{"track":""#track_ID=1"" }]
                    }]
                }
            ]
        }
    },
    "scene": 0
}
```

```
"meshes": {
    {
        "primitives": [
            {
                "material": 0,
                "attributes": {
                    "POSITION": 1,
                    "TEX_COORD_0": 2
                    ...
                },
            }
        ]
    }
}
```

*FIG. 13*

| DATA FORMAT | View Independent (VI) MESH INFORMATION M | UV TEXTURE MAP (DEVELOPMENT VIEW) Ta | View Dependent (VD) MESH INFORMATION M | CAMERA VIDEO OF PLURALITY OF VIEWPOINTS Tb |
|---|---|---|---|---|
| CHARACTERISTICS | TEXTURE DOES NOT CHANGE WHEN VIEWPOINT POSITION CHANGES | | TEXTURE CHANGES WHEN VIEWPOINT POSITION CHANGES | |
| RENDERING IMAGE QUALITY | LOW QUALITY (DEPENDING ON SHAPE OF 3D OBJECT) | | HIGH QUALITY | |
| RENDERING PROCESSING | LIGHT | | HEAVY | |
| DATA AMOUNT | SMALL | | LARGE | |

Figure 16:
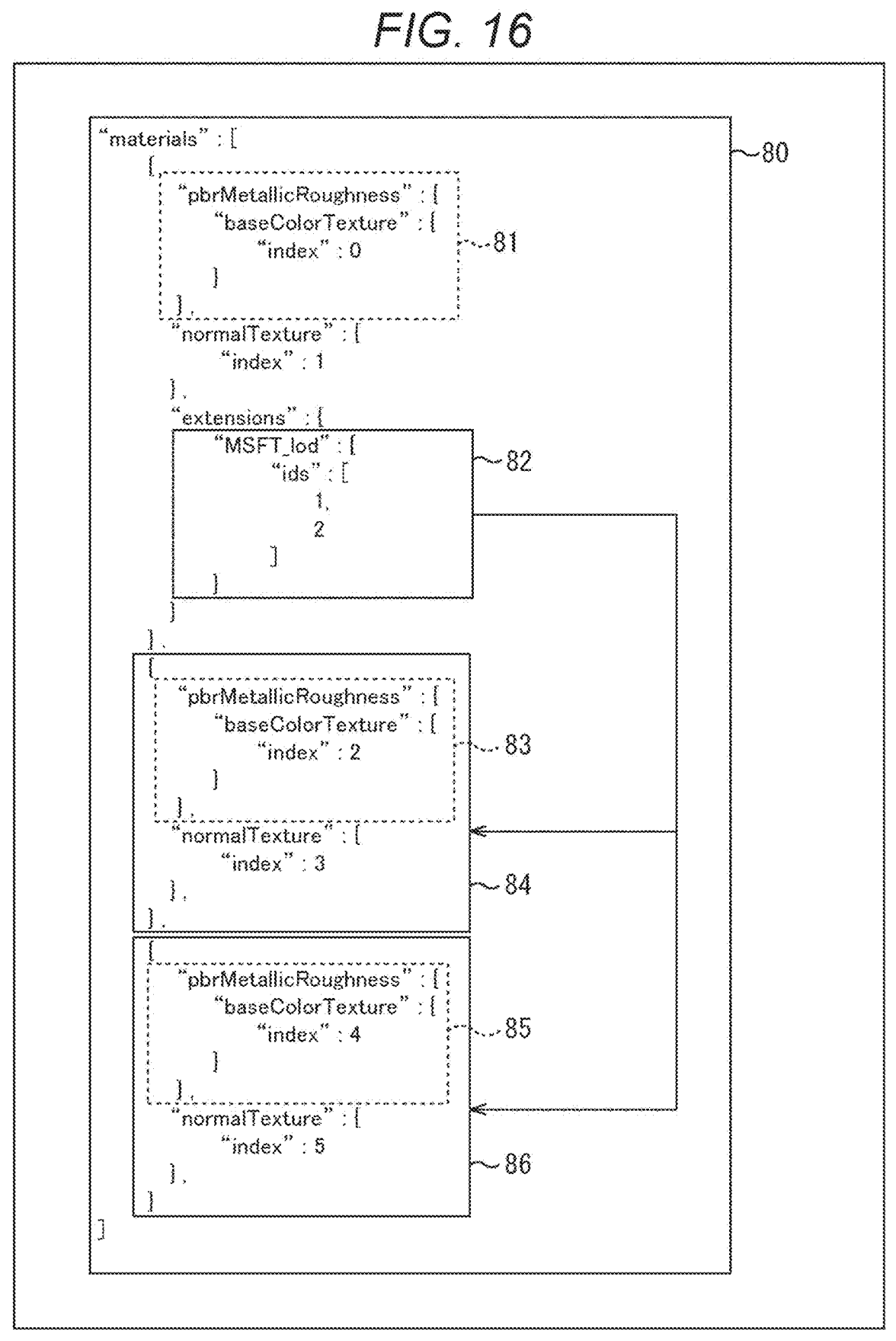

```
"materials" : [                                                    ~80
    {
        "pbrMetallicRoughness" : {
            "baseColorTexture" : {
                "index" : 0                        ~81
            }
        }
        "normalTexture" : {
            "index" : 1
        },
        "extensions" : {
            "MSFT_lod" : {                          ~82
                "ids" : [
                    1,
                    2
                ]
            }
        }
    },
    {
        "pbrMetallicRoughness" : {
            "baseColorTexture" : {
                "index" : 2                        ~83
            }
        },
        "normalTexture" : {
            "index" : 3
        },                                          ~84
    },
    {
        "pbrMetallicRoughness" : {
            "baseColorTexture" : {
                "index" : 4                        ~85
            }
        },
        "normalTexture" : {
            "index" : 5
        },                                          ~86
    }
]
```

FIG. 18

| | |
|---|---|
| METHOD 1 | DEFINE extension FOR 3D OBJECT VIDEO IN material OF SD, AND SET INDEX TO EACH VIDEO COMPONENT |
| METHOD 1-1 | SET INDEX TO EACH VD texture (VD texture AND Packed VD texture) |
| METHOD 1-2 | SET INDEX TO EACH VIDEO COMPONENT OF V-PCC (geometry, attribute, OR occupancy) |
| METHOD 1-3 | STORE CAMERA PARAMETER FOR VD texture |
| METHOD 1-3-1 | SET INDEX TO EACH FIELD |
| METHOD 1-4 | STORE CAMERA PARAMETERS AND PACKING METADATA OF Packed VD texture |
| METHOD 1-4-1 | SET INDEX TO EACH VD texture PACKED |
| METHOD 1-4-2 | SET INDEX TO EACH FIELD |
| METHOD 1-5 | UNPACK VD texture BY MAF FROM Packed VD texture AND STORE VD texture IN BUFFER |
| METHOD 1-6 | MAP Packed VD texture BY MAF AND STORE UV texture IN BUFFER |

```
"materials": [
    {
        "pbrMetallicRoughness": {
            "baseColorTexture": {
                "index": 0,
                "extensions": {
                 "MPEG_video_components": {
                  "vdTexture": {
                    "index": 1 # texture index
                  },
                  "packedVdTexture": {
                    "index": 2 # texture index
                  },
                  ...
                 }
                }
            }
        }
    },
    ...
],
"textures" : [
    {
        "name": "baseColorTexture",
        "source": 0
        "extensions": {"MPEG_texture_video": {...}}
    },
    {
        "name": "vdTexture",
        "source": 1
        "extensions": {"MPEG_texture_video": {...}}
    },
    {
        "name": "packedVdTexture",
        "source": 2
        "extensions": {"MPEG_texture_video": {...}}
    },
],
...
```

```
{
    "materials": [
        {
            "pbrMetallicRoughness": {
                "baseColorTexture": {
                    "index": 0
                    "extensions": {
                        "MPEG_video_components": {
                            "vdTexture": {
                                "index": 1,
                                "cameraParam": 100, # accessor index
                            },
                            ...

,
                            "packedVdTexture": {
                                "index": 2
                            },
                            ...
                        }
                    }
                }
            },
        },
        ...
    ],
    "textures": [
        {...},
    ],
    ...
}
```

FIG. 24

```
{
  unsigned int(8) cam_id;
  float[9] intrinsic_param;
  float[9] Rs;
  float[3] Ts;
  float[8] distortion;
}
```

FIG. 25

```
{
    "materials": [
        {
            "pbrMetallicRoughness": {
                "baseColorTexture": {
                    "index": 0
                    "extensions": {
                        "MPEG_video_components": {
                            "vdTexture": {
                                "index": 1,
                                "cameraId": 100, # accessor index, SCALAR, UNSIGNED_BYTE
                                "instrinsicParam": 101 # accessor index, MAT3, FLOAT
                                "Rs": 102 # accessor index, MAT3, FLOAT
                                "Ts": 103 # accessor index, VEC3, FLOAT
                                "distortion": 104 # accessor index, MAT3, FLOAT
                            },
                            ...
                            ,
                            "packedVdTexture": {
                                "index": 2
                            },
                            ...
                        }
                    }
                }
            },
        },
        ...
    ],
    "textures": [
        {...},
    ],
    ...
}
```

FIG. 26

```
{
    "materials": [
        {
            "pbrMetallicRoughness": {
            "baseColorTexture": {
                "index": 0
                "extensions": {
                    "MPEG_video_components ": {
                    "vdTexture": {
                        "index": 1,
                        "cameraParam": 100, # accessor index
                        ...,
                    },
                    ...

"packedVdTexture": {
                        "index": 2
                        "packedCameraParam": 200, # accessor
                        "packedMeta": 201, # accessor
                        ... ,
                    },
                    ...
                }
            }
            }
        },
        ...
    ],
    "textures": [
        {...},
    ],
    ...
}
```

FIG. 27

```
{
  unsinged int(8) camera_num;
  for ( int i; i < camera_mum; i++) {
    unsigned int(8) cam_id;
    float(32)[9] intrinsic_param;
    float(32)[9] Rs;
    float(32)[3] Ts;
    float(32)[8] distortion;
  }
}
```

FIG. 28

```
{
  unsinged int(8) camera_num;
  for ( int i; i < camera_mum; i++) {
    unsigned int(8) cam_id;

unsigned int(16) src_width[i];
    unsigned int(16) src_height[i]
    unsigned int(16) src_top[i];
    unsigned int(16) src_left[i];
    unsigned int(3) transform_type[i];
    bit(5) reserved = 0;
    unsigned int(16) dst_width[i];
    unsigned int(16) dst_height[i];
    unsigned int(16) dst_top[i];
    unsigned int(16) dst_left[i];
  }
}
```

FIG. 29

```
{
   "materials": [
      {
         "pbrMetallicRoughness": {
            "baseColorTexture": {
               "index": 0
               "extensions": {
                  "MPEG_video_components": {
                     "vdTexture": {
                        "index": 1,
                        "cameraParam": 100, # accessor index
                        ...,
                     },
                     ...

,
                     "packedVdTexture": {
                        "index": 2
                        "packedCameraParam_1": 100 # accessor
                        "packedCameraParam_2": 200 # accessor
                        ...
                        "packedMeta_1": 101 # accessor
                        "packedMeta_2": 201 # accessor
                        ...
                     },
                     ...
                  }
               }
            }
         }
      },
      ...
   ],
   "textures": [
      {...},
   ],
   ...
}
```

FIG. 30

```
{
  float(32)[9] intrinsic_param;
  float(32)[9] Rs;
  float(32)[3] Ts;
  float(32)[8] distortion;
}
```

FIG. 31

```
{
  unsigned int(16) src_width;
  unsigned int(16) src_height;
  unsigned int(16) src_top;
  unsigned int(16) src_left;
  unsigned int(3) transform_type;
  bit(5) reserved = 0;
  unsigned int(16) dst_width;
  unsigned int(16) dst_height;
  unsigned int(16) dst_top;
  unsigned int(16) dst_left;
}
```

*FIG. 32*

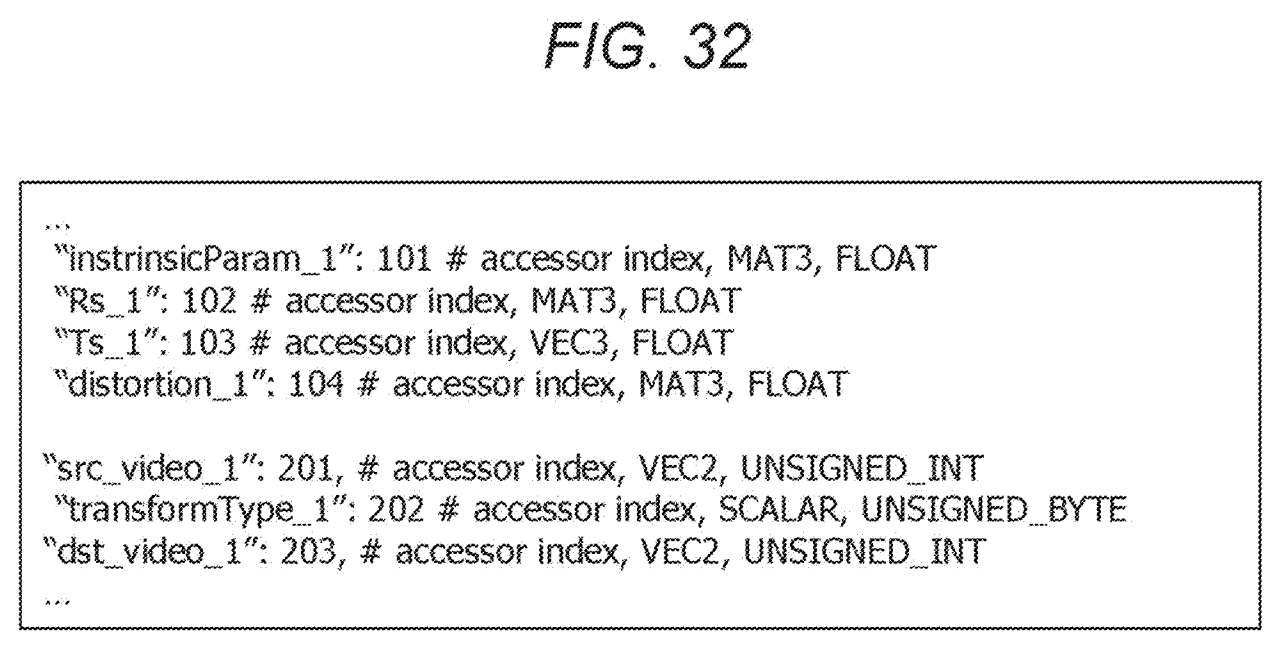

```
...
"instrinsicParam_1": 101 # accessor index, MAT3, FLOAT
"Rs_1": 102 # accessor index, MAT3, FLOAT
"Ts_1": 103 # accessor index, VEC3, FLOAT
"distortion_1": 104 # accessor index, MAT3, FLOAT "src_video_1": 201, # accessor index, VEC2, UNSIGNED_INT
"transformType_1": 202 # accessor index, SCALAR, UNSIGNED_BYTE
"dst_video_1": 203, # accessor index, VEC2, UNSIGNED_INT
...
```

FIG. 33

```
"extensions": {
    "MPEG_media": {
        media: [
            {
                "name": "source1",
                "startTime": 9.0,
                "startTimeOffset": 10.0,
                "loop": "true",
                "controls": "false",
                "alternatives": [
                    {
                        "mimeType": "video/mp4;codecs=¥"resv.vdte.avc1.42E01E¥"'",
                        "uri": "vd_tex.mp4",
                        "tracks": [
                            {
                                "track": "#track_ID=1"
                            }
                        ]
                    }
                ]
            }
        ]
    }
}
```

*FIG. 38*

INFORMATION PROCESSING DEVICE AND METHOD

CROSS-REFERENCE TO RELATED APPLICATIONS

The present application is based on PCT filing PCT/JP2022/035332, filed Sep. 22, 2022, which claims priority to U.S. Provisional Application No. 63/249,664, filed Sep. 29, 2021, the entire contents of each are incorporated herein by reference.

TECHNICAL FIELD

The present disclosure relates to an information processing device and method, and more particularly relates to an information processing device and method capable of simultaneously using a plurality of video components for one object using a scene description.

BACKGROUND ART

In the related art, there is the GL transmission format (glTF) (registered trademark) 2.0 that is a format of a scene description (Scene Description) for disposing and rendering a 3D (three-dimensional) object in a three-dimensional space (for example, see Non Patent Document 1).

Furthermore, in the moving picture experts group (MPEG)-I Scene Description, a method of expanding the glTF 2.0 and handling dynamic content in the time direction has been proposed (for example, see Non Patent Document 2).

Furthermore, rendering support for a 3D object video including a texture video and a dynamic mesh has been proposed (see, for example, Non Patent Document 3). In addition, there has been a technique of encoding a texture video in a View Dependent Texture (VD texture) format among 3D objects including the texture video and the dynamic mesh (see, for example, Patent Document 1 and Patent Document 2). In a case of the VD texture method, it is possible to display a 3D object with higher image quality than a conventional texture video.

The VD texture is a texture video mapped to a mesh according to a viewpoint, and in a case of the VD texture method, a plurality of VD textures mapped from different directions is prepared for one dynamic mesh. This VD texture allows a plurality of VD textures to be simultaneously mapped to one mesh.

In recent years, like the VD texture method, it has been expected to support 3D data in which a plurality of video components can be simultaneously used for one 3D object in the MPEG-I Scene Description.

Note that, in the mesh.primitives.attribute layer of the scene description, there has been a method of dividing accessors for each tile (see, for example, Non Patent Document 4). Furthermore, there is a method of linking a plurality of LOD textures to a material (materials) layer of the scene description so that a texture to be used can be switched according to a change in a viewpoint position (see, for example, Non Patent Document 5). Note that the bit stream of the 3D object video as described above can be stored in, for example, International Organization for Standardization Base Media File Format (ISOBMFF) (see, for example, Non Patent Document 6).

CITATION LIST

Non Patent Document

Non Patent Document 1: Saurabh Bhatia, Patrick Cozzi, Alexey Knyazev, Tony Parisi, "Khronos glTF2.0", https://github.com/KhronosGroup/glTF/tree/master/specification/2.0, Jun. 9, 2017

Non Patent Document 2: "Potential improvement of ISO/IEC DIS 23090-14 Scene Description for MPEG Media", ISO/IEC JTC 1/SC 29/WG 03 N0321, 2021-08-03

Non Patent Document 3: "Technologies under Consideration on Scene Description for MPEG Media", ISO/IEC JTC 1/SC 29/WG 03 N292, 2021-07-26

Non Patent Document 4: Imed Bouazizi, Thomas Stockhammer, "Attribute Registration for V3C", ISO/IEC JTC 1/SC 29/WG 03 m57411, 2021-07-07

Non Patent Document 5: Saurabh Bhatia, Gary Hsu, Adam Gritt, John Copic, Marc Appelsmeier, Dag Frommhold, "MSFT_lod", https://github.com/KhronosGroup/glTF/blob/main/extensions/2.0/Vendor/MSFT_lod/README.md Non Patent Document 6: "Information technology—JPEG 2000 image coding system—Part 12: ISO base media file format", ISO/IEC FDIS 14496-12:2018, 2020-12

Patent Document

Patent Document 1: WO 2021/079592
Patent Document 2: WO 2021/193213

SUMMARY OF THE INVENTION

Problems to be Solved by the Invention

However, in the conventional MPEG-I Scene Description, a plurality of video components that can be simultaneously used for one 3D object cannot be described in a scene description.

The present disclosure has been made in view of such a situation, and enables simultaneous use of a plurality of video components for one object using a scene description.

Solutions to Problems

An information processing device according to one aspect of the present technology is an information processing device including a file processing unit that stores a video component included in a 3D object video in a buffer corresponding to the video component on the basis of a component index, and a display image generation unit that acquires the video component from the buffer on the basis of the component index, and generates a display image using the acquired video component, in which a plurality of the video components is simultaneously usable in one 3D object, and the component index is set to the video component included in the 3D object video in an extension for the 3D object video defined in a material layer of a scene description, and has a different value for each of the video components.

An information processing method according to one aspect of the present technology is an information processing method including storing a video component included in a 3D object video in a buffer corresponding to the video component on the basis of a component index, and acquiring the video component from the buffer on the basis of the component index, and generating a display image using the acquired video component, in which a plurality of the video components is simultaneously usable in one 3D object, and the component index is set to the video component included in the 3D object video in an extension for the 3D object video defined in a material layer of a scene description, and has a different value for each of the video components.

An information processing device according to another aspect of the present technology is an information processing device including a file generation unit that generates a scene description file and sets a component index to a video component included in a 3D object video in an extension for the 3D object video defined in a material layer of the scene description file, the component index having a different value for each of the video components, in which a plurality of the video components is simultaneously usable in one 3D object.

An information processing method according to another aspect of the present technology is an information processing method including generating a scene description file and setting a component index to a video component included in a 3D object video in an extension for the 3D object video defined in a material layer of the scene description file, the component index having a different value for each of the video components, in which a plurality of the video components is simultaneously usable in one 3D object.

In the information processing device and the method according to one aspect of the present technology, a video component included in a 3D object video is stored in a buffer corresponding to the video component on the basis of a component index, the video component is acquired from the buffer on the basis of the component index, and a display image is generated using the acquired video component.

In the information processing device and method according to another aspect of the present technology, a scene description file is generated, and a component index is set to a video component included in a 3D object video in an extension for the 3D object video defined in a material layer of the scene description file, the component index having a different value for each of the video components.

BRIEF DESCRIPTION OF DRAWINGS

FIG. 6 is a diagram for describing an object extension method.

FIG. 9 is a diagram illustrating a description example of a scene description.

FIG. 11 is a diagram illustrating a configuration example of an object in a scene description that supports the dynamic mesh and the texture video.

FIG. 12 is a diagram illustrating a description example of a scene description.

FIG. 13 is a diagram for describing a VD texture.

FIG. 14 is a diagram for describing a packed VD texture.

FIG. 16 is a diagram illustrating a description example of a scene description supporting switching of texture.

FIG. 18 is a diagram illustrating an example of a method of simultaneously using a plurality of video components for one object using a scene description.

FIG. 19 is a diagram illustrating a configuration example of an object in a scene description in which a plurality of video components can be simultaneously used for one object.

FIG. 20 is a diagram illustrating a description example of a scene description.

FIG. 22 is a diagram illustrating a configuration example of an object in a scene description supporting a packed VD texture.

FIG. 23 is a diagram illustrating a description example of a scene description for storing a camera parameter of a VD texture.

FIG. 24 is a diagram illustrating a description example of camera parameters.

FIG. 25 is a diagram illustrating a description example of a scene description for storing camera parameters of a VD texture in which an index is set to each of fields.

FIG. 26 is a diagram illustrating a description example of a scene description for storing camera parameters and packing metadata of a packed VD texture.

FIG. 27 is a diagram illustrating a description example of camera parameters.

FIG. 28 is a diagram illustrating a description example of packing metadata.

FIG. 29 is a diagram illustrating a description example of a scene description for storing camera parameters and packing metadata of a packed VD texture for which an index is set to each VD texture.

FIG. 30 is a diagram illustrating a description example of camera parameters.

FIG. 31 is a diagram illustrating a description example of packing metadata.

FIG. 32 is a diagram illustrating a description example of a camera parameter in which an index is set to each of fields.

FIG. 33 is a diagram illustrating a description example of a scene description.

FIG. 38 is a block diagram illustrating a main configuration example of a computer.

MODE FOR CARRYING OUT THE INVENTION

Hereinafter, modes for carrying out the present disclosure (hereinafter referred to as embodiments) will be described. Note that the description will be made in the following order.

1. Documents and the like supporting technical content and technical terms
2. MPEG-I scene description
3. Scene description corresponding to a plurality of video components
4. First embodiment (file generation device)
5. Second embodiment (client device)
6. Appendix

1. DOCUMENTS AND THE LIKE SUPPORTING TECHNICAL CONTENT AND TECHNICAL TERMS

The scope disclosed in the present technology includes not only the contents described in the embodiments but also the contents described in the following non-patent documents and patent documents and the like which are publicly known at the time of filing, the contents of other documents referred to in the following non-patent documents and patent documents.

Non Patent Document 1: (described above)
Non Patent Document 2: (described above)
Non Patent Document 3: (described above)
Non Patent Document 4: (described above)
Non Patent Document 5: (described above)
Non Patent Document 6: (described above)
Patent Document 1: (described above)
Patent Document 2: (described above)

That is, contents described in the above-described non-patent documents and patent documents, contents of other documents referred to in the above-described non-patent documents and patent documents, and the like serve as bases for determining the support requirements. For example, even in a case where glTF 2.0 and its extensions described in Non Patent Document 1 to Non Patent Document 5, terms used in the 3D object configuration described in Patent Document 1 and Patent Document 2, a file format structure of Non Patent Document 6, and the like are not directly defined in the detailed description of the invention, they are within the scope of the present disclosure and satisfy the support requirements of the claims. Furthermore, for example, technical terms such as parsing, syntax, and semantics are similarly within the scope of the present disclosure and satisfy the support requirements of the claims even in a case where not directly defined in the detailed description of the invention.

2. MPEG-I SCENE DESCRIPTION

Figure 1:
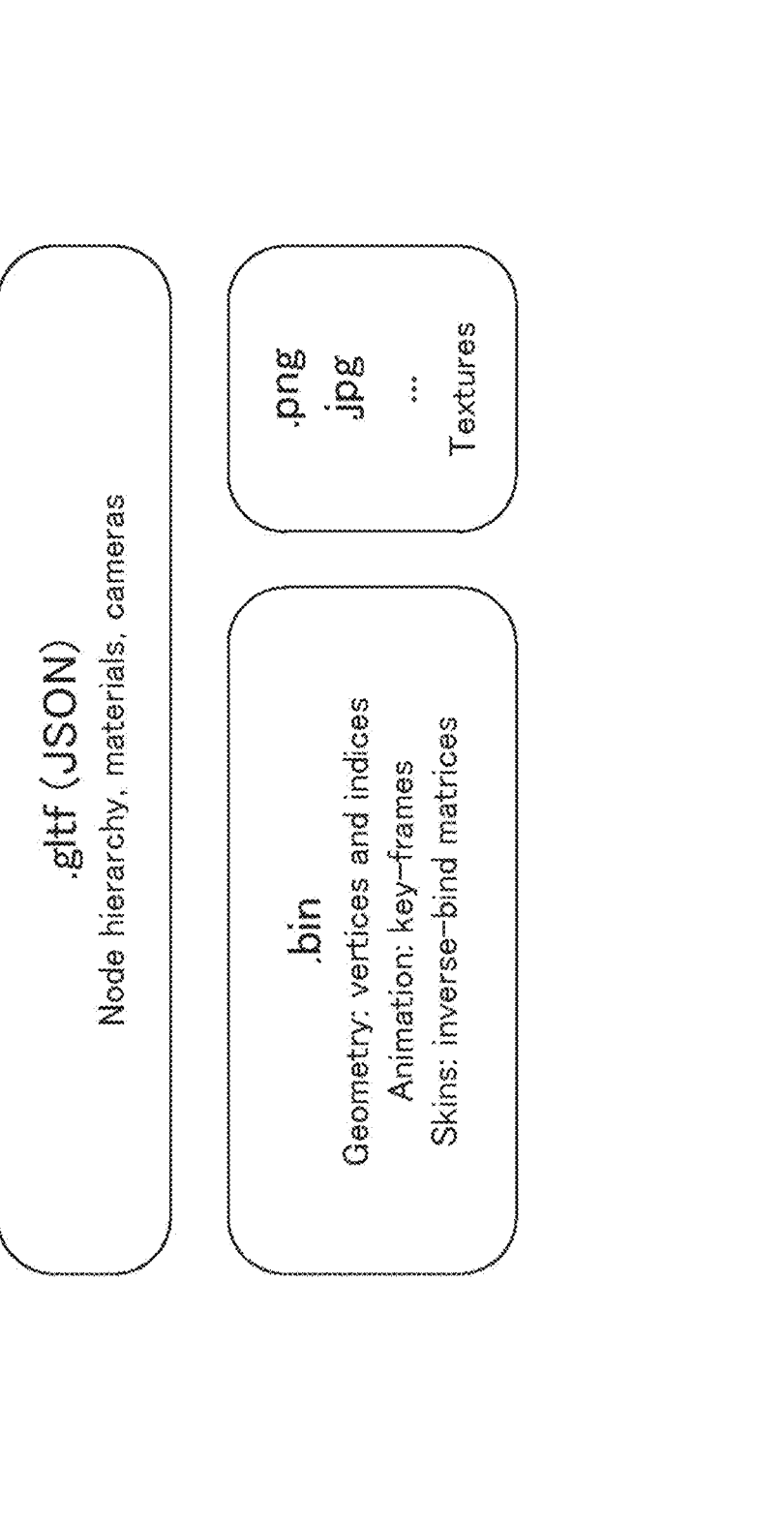
FIG. 1 is a diagram illustrating a main configuration example of a glTF 2.0.

<gltf2.0>
In the related art, for example, as described in Non Patent Document 1, there is the GL Transmission Format (glTF) (registered trademark) 2.0 that is a format for disposing a 3D (three-dimensional) object in a three-dimensional space. For example, as illustrated in FIG. 1, the glTF 2.0 includes a JSON format file (.glTF), a binary file (.bin), and an image file (.png, .jpg, and the like). The binary file stores binary data such as geometry and animation. The image file stores data such as texture.

The JSON format file is a scene description file (scene description file) described in JSON (JavaScript (registered trademark) Object Notation). The scene description is meta-data describing (a description of) a scene of the 3D content. The description of the scene description defines what kind of scene the scene is. The scene description file is a file that stores such a scene description. In the present disclosure, the scene description file is also referred to as a scene description file.

The description of the JSON format file includes a list of pairs of a key (KEY) and a value (VALUE). An example of the format will be described below.

"KEY": "VALUE"

The key includes a character string. The value includes a numerical value, a character string, a true/false value, an array, an object, null, or the like.

In addition, a plurality of pairs of a key and a value ("KEY": "VALUE") can be put together using { } (braces). The object put together in braces is also referred to as a JSON object. An example of the format will be described below.

"user": {"id": 1, "name": "tanaka"}

In this example, a JSON object in which a pair of "id":1 and a pair of "name": "tanaka" are put together is defined as a value corresponding to a key (user).

In addition, zero or more values can be disposed using [ ] (square brackets). This array is also referred to as a JSON array. For example, a JSON object can be applied as an element of this JSON array. An example of the format will be described below.

```
test":["hoge", "fuga", "bar"]
    "users":[{"id":1,
"name":"tanaka"},{"id":2,"name":"yamada"},{"id":3,
"name":"sato"}]
```

Figure 2:
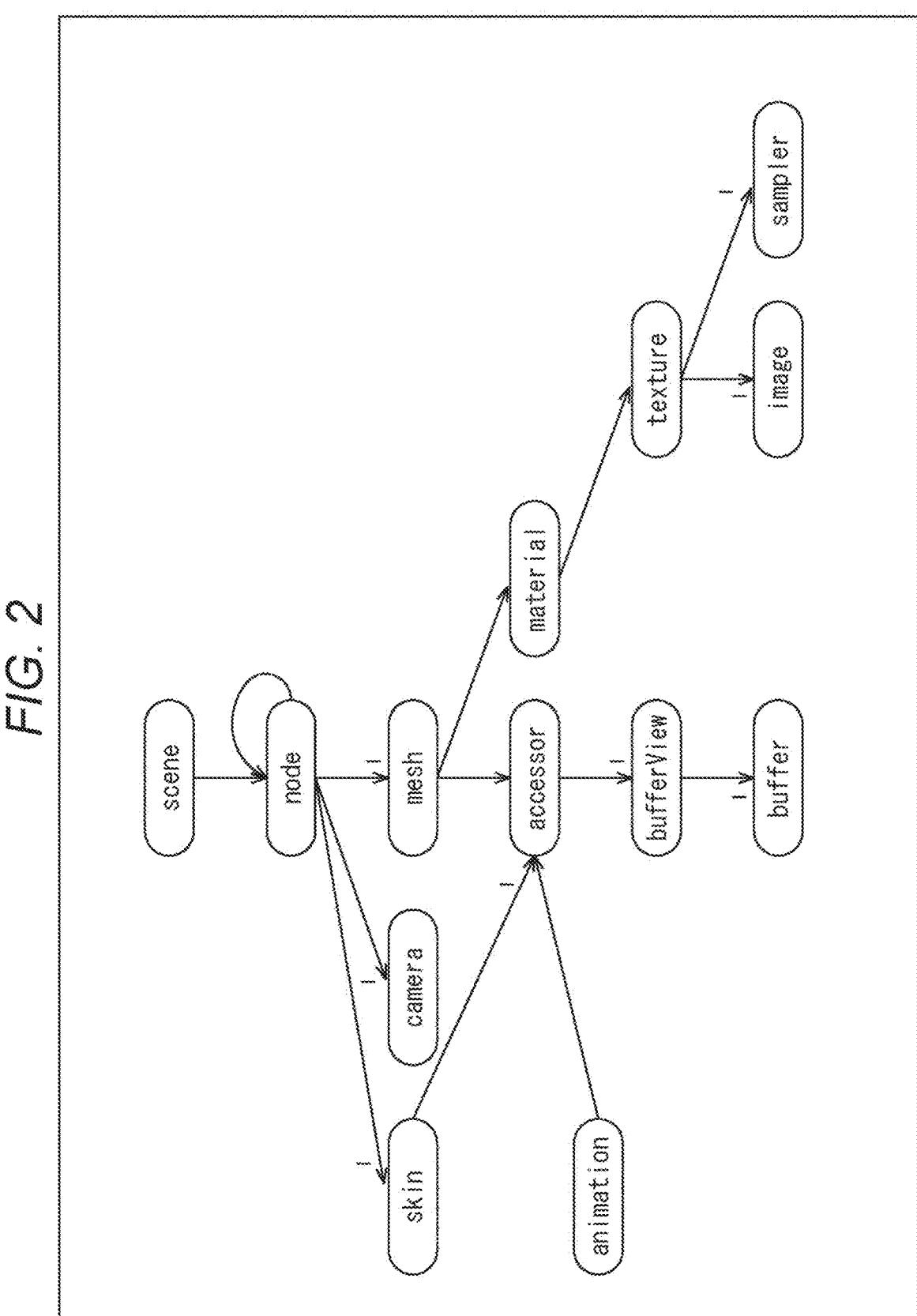
FIG. 2 is a diagram illustrating an example of a glTF object and a reference relationship.

FIG. 2 illustrates glTF objects (glTF object) that can be described at the top of the JSON format file and a reference relationship that they have. Long circles in the tree structure illustrated in FIG. 2 indicate objects, and arrows between the objects indicate reference relationships. As illustrated in FIG. 2, objects such as "scene", "node", "mesh", "camera", "skin", "material", and "texture" are described at the top of the JSON format file.

Figure 3:
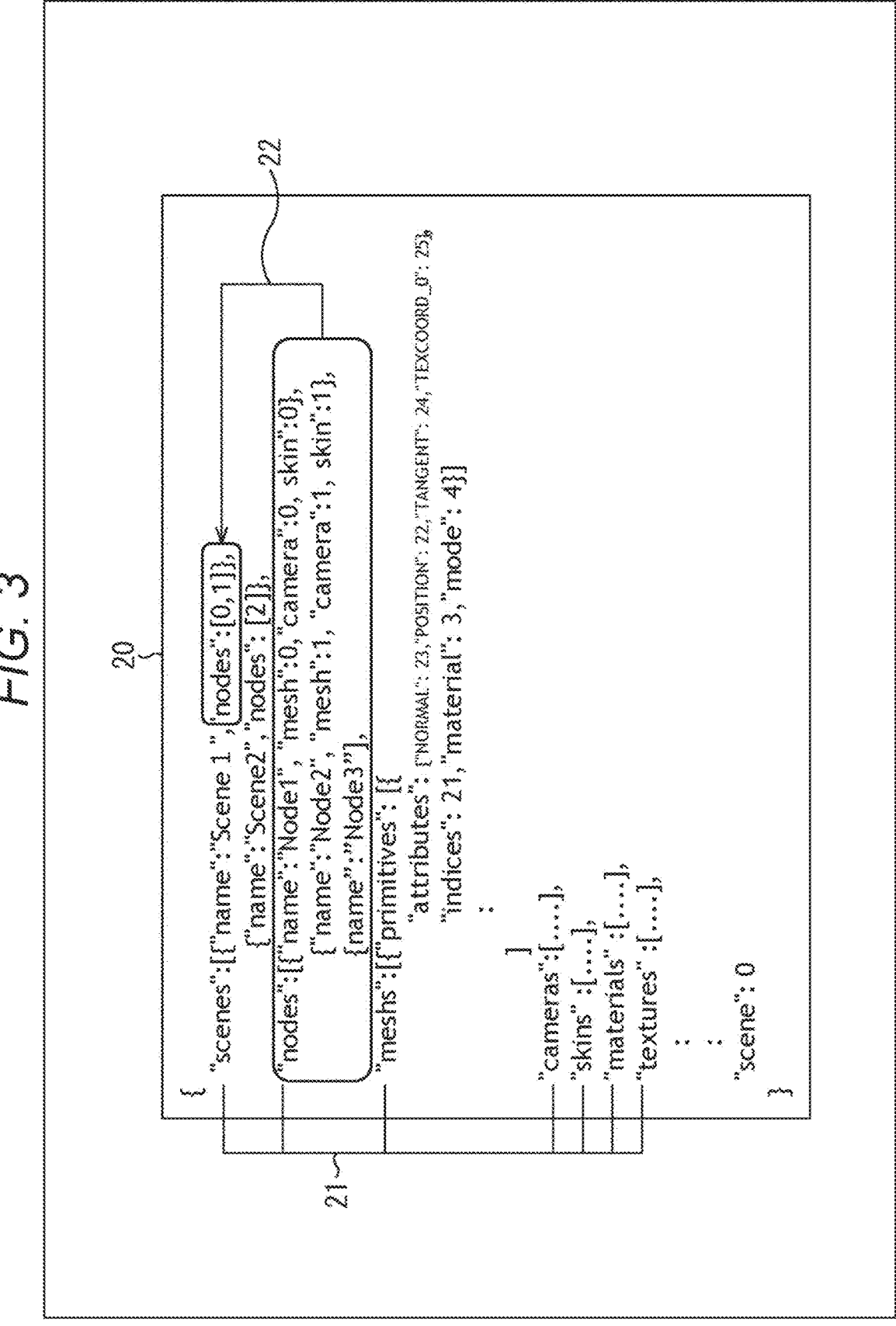
FIG. 3 is a diagram illustrating a description example of a scene description.

A description example of such a JSON format file (scene description) is illustrated in FIG. 3. A JSON format file 20 of FIG. 3 illustrates a description example of part of the top. In the JSON format file 20, all the used top-level objects (top-level object) 21 are described at the top. The top-level object 21 is the glTF object illustrated in FIG. 2. Furthermore, in the JSON format file 20, a reference relationship between objects (object) is indicated as indicated by an arrow 22. More specifically, the reference relationship is indicated by designating an index (index) of an element of the array of the object to be referred to with the property (property) of the superior object.

Figure 4:
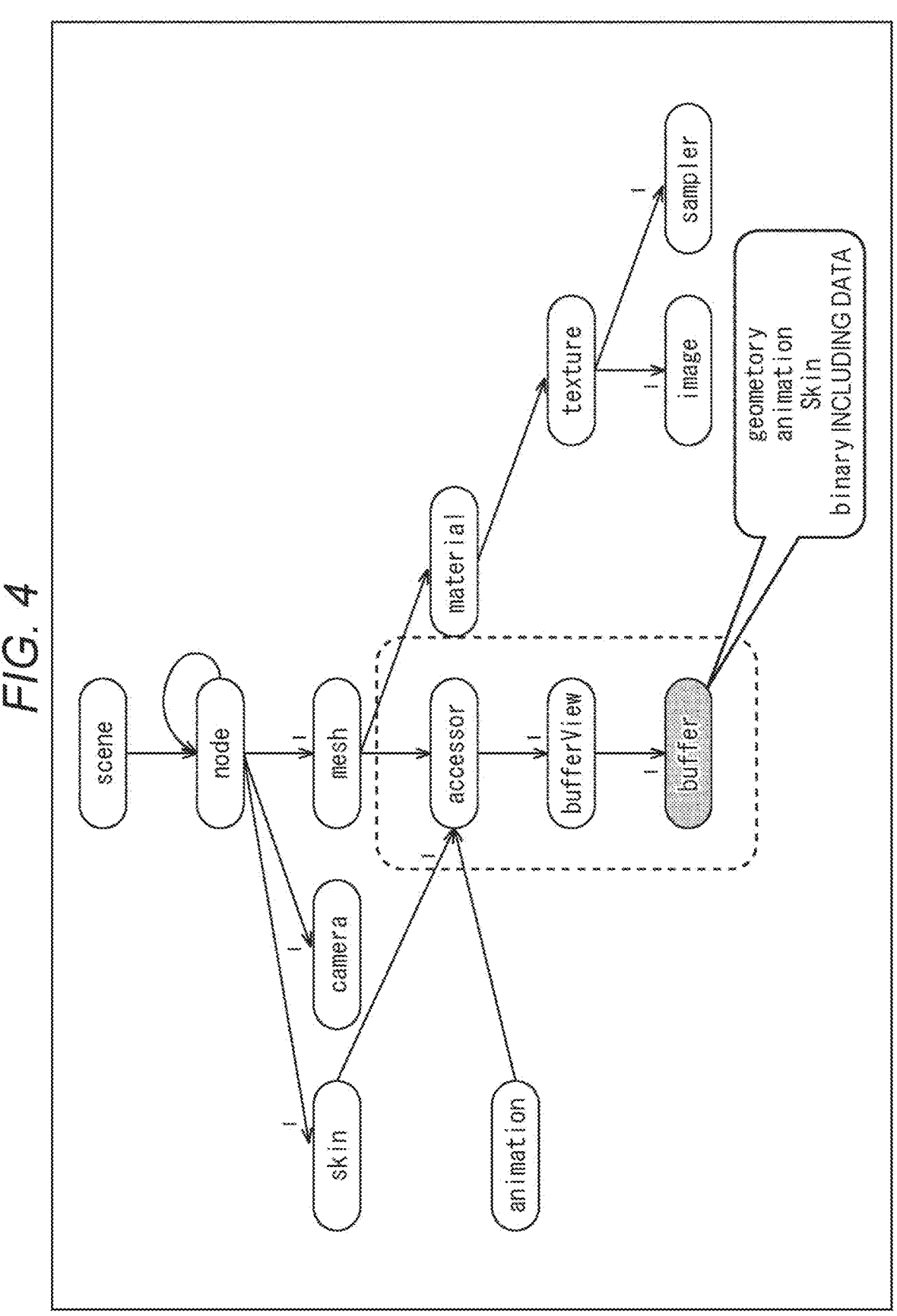
FIG. 4 is a diagram for describing a method of accessing binary data.

<Method of Accessing Data>
FIG. 4 is a diagram illustrating a method of accessing binary data. As illustrated in FIG. 4, the binary data is stored in the buffer object (buffer object). That is, information (for example, a uniform resource identifier (URI) or the like) for accessing the binary data in the buffer object is indicated. In the JSON format file, as illustrated in FIG. 4, it is possible to access the buffer object via an accessor object (accessor object) and a buffer view object (bufferView object), for example, from objects such as a mesh (mesh), a camera (camera), and a skin (skin).

Figure 5:
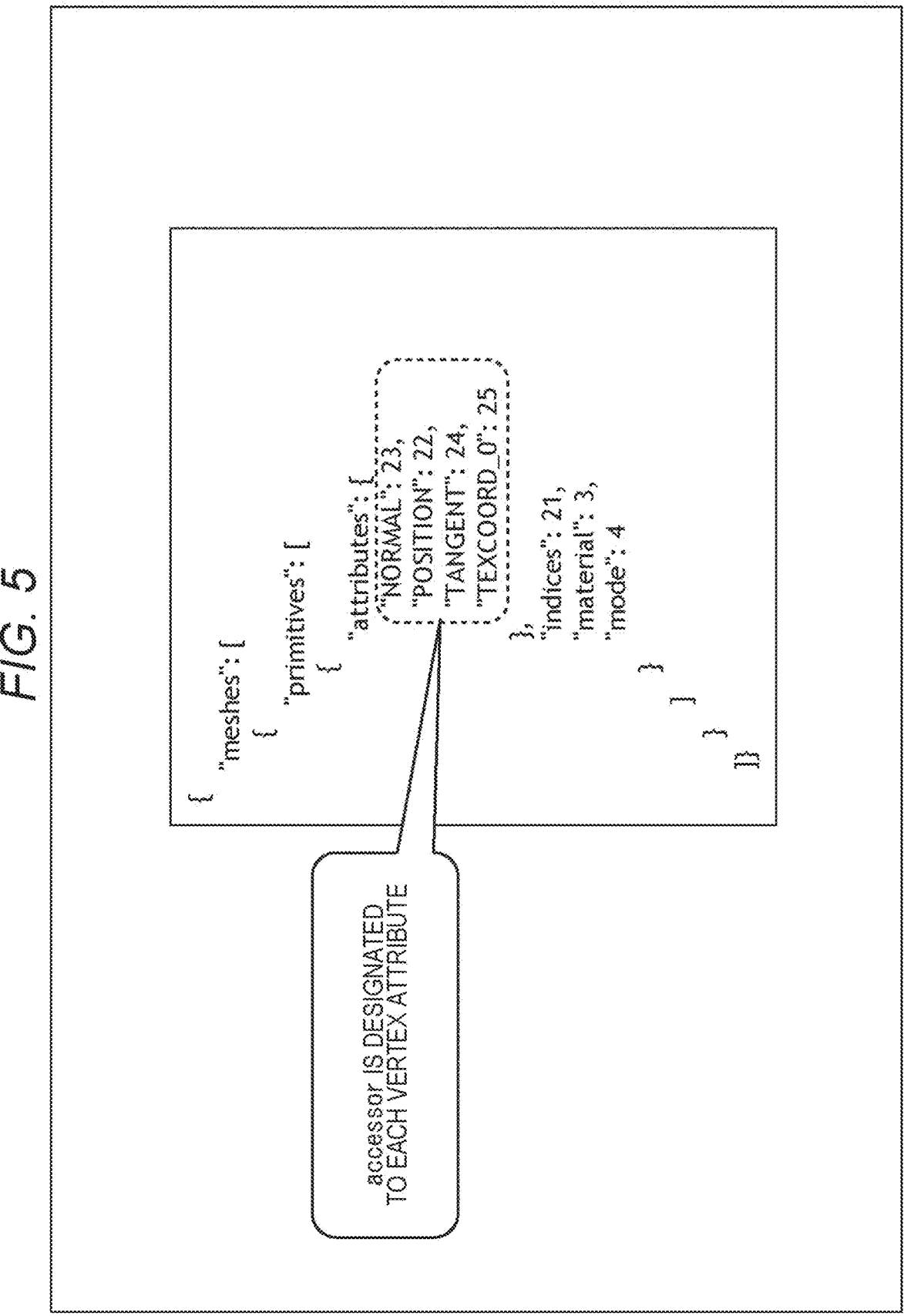
FIG. 5 is a diagram illustrating a description example of a scene description.

That is, in an object such as the mesh (mesh), the camera (camera), or the skin (skin), an accessor object to be referred to is designated. FIG. 5 illustrates a description example of the mesh object (mesh) in the JSON format file. For example, as illustrated in FIG. 5, in the mesh object, attributes (attribute) of vertices such as NORMAL, POSI-TION, TANGENT, and TEXCORD_0 are defined as keys, and an accessor object to be referred to is designated as a value for each attribute.

<Extension of Object>

Next, an extension of an object of such a scene description will be described. Each object of glTF 2.0 may store a newly defined object in an extension object (extension object). FIG. 6 illustrates a description example in a case where a newly defined object (ExtensionExample) is specified. As illustrated in FIG. 6, in a case where a newly defined extension is used, the extension object name (in the example of FIG. 6, ExtensionExample) is described in "extension-Used" and "extensionRequired". This indicates that this extension is an extension that is used or is an extension required for load (load).

<Client Process>

Next, processing of the client device in the Moving Picture Experts Group (MPEG)-I Scene Description will be described. The client device acquires a scene description, acquires data of a 3D object on the basis of the scene description, and generates a display image using the scene description and the data of the 3D object.

Figure 7:
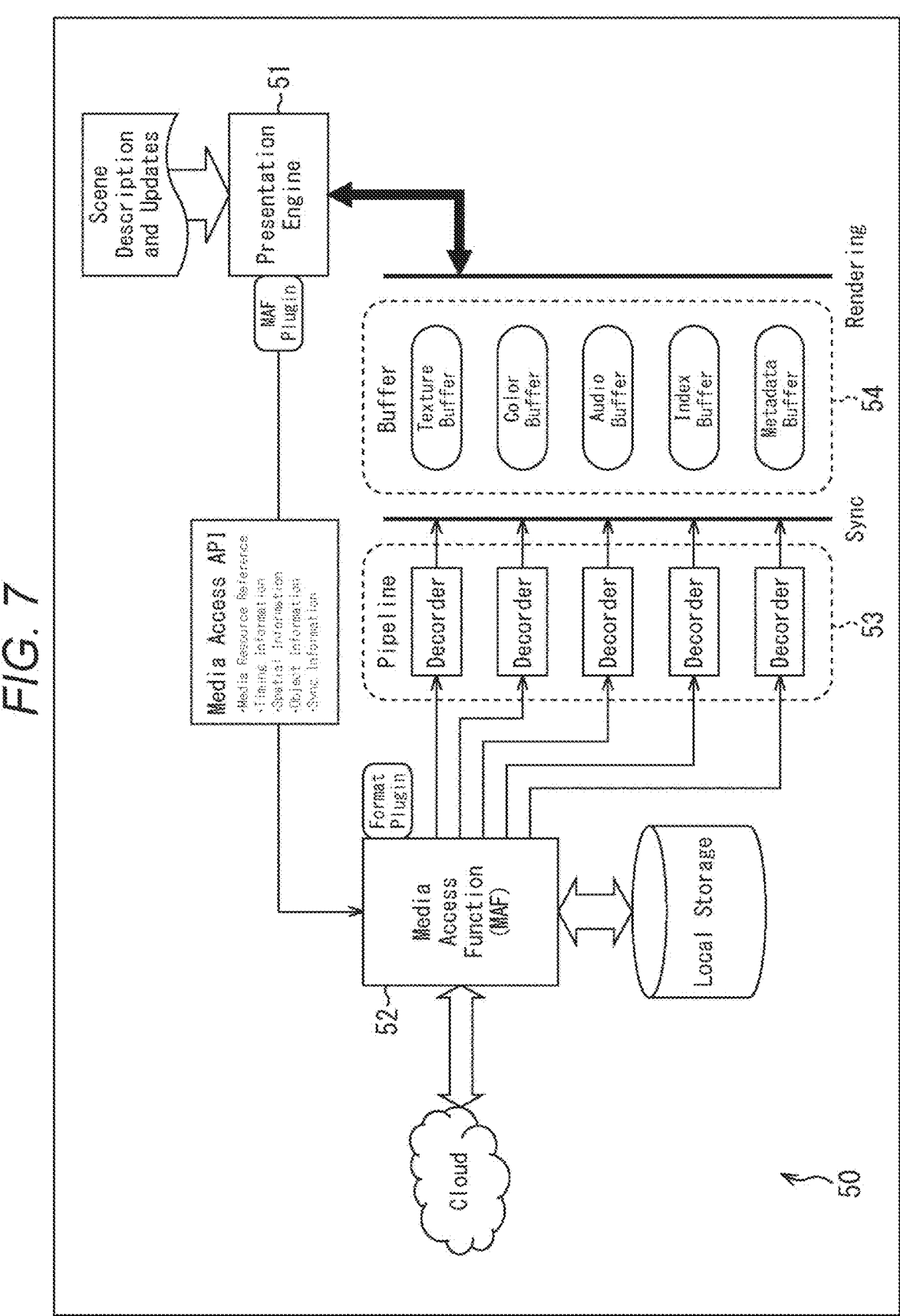
FIG. 7 is a diagram illustrating a configuration of a client process.

As described in Non Patent Document 2, in the client device, a presentation engine, a media access function, or the like performs a process. For example, as illustrated in FIG. 7, a presentation engine (Presentation Engine) 51 of a client device 50 acquires an initial value of a scene description and information (hereinafter, also referred to as update information) for updating the scene description, and generates the scene description at the processing target time. Then, the presentation engine 51 parses the scene description and identifies a medium (moving image, audio, or the like) to be reproduced. Then, the presentation engine 51 requests a media access function (Media Access Function) 52 to acquire the medium via a media access API (Media Access API (Application Program Interface)). Furthermore, the presentation engine 51 also performs setting of a pipeline process, designation of a buffer, and the like.

The media access function 52 acquires various pieces of data of media requested by the presentation engine 51 from a cloud (Cloud), a local storage (Local Storage), or the like. The media access function 52 supplies the acquired various pieces of data (coded data) of the media to a pipeline (Pipeline) 53.

The pipeline 53 decodes various pieces of data (coded data) of the supplied media by a pipeline process, and supplies a decoding result to a buffer (Buffer) 54. The buffer 54 holds various pieces of data of the supplied medium.

The presentation engine 51 performs rendering (Rendering) or the like using various pieces of data of media held in the buffer 54.

<Application of Timed Media>

In recent years, for example, as described in Non Patent Document 2, in the MPEG-I Scene Description, it has been studied to extend the glTF 2.0 and to apply timed media (Timed media) as 3D object content. The timed media is media data that changes in the time direction like a moving image in a two-dimensional image. In the present specification, changing in the time direction is also referred to as "dynamic". In addition, not changing in the time direction is also referred to as "static".

The glTF was applicable only to static data as media data (3D object content). That is, the glTF does not correspond to dynamic media data. In a case where the 3D object is made dynamic, animation (a method of switching static media data in a time direction) has been applied.

In the MPEG-I Scene Description, it has been studied to apply the glTF 2.0, apply a JSON format file as a scene description, and further extend the glTF so that timed media (for example, video data) can be handled as media data. In order to handle timed media, for example, the following extension is performed.

Figure 8:
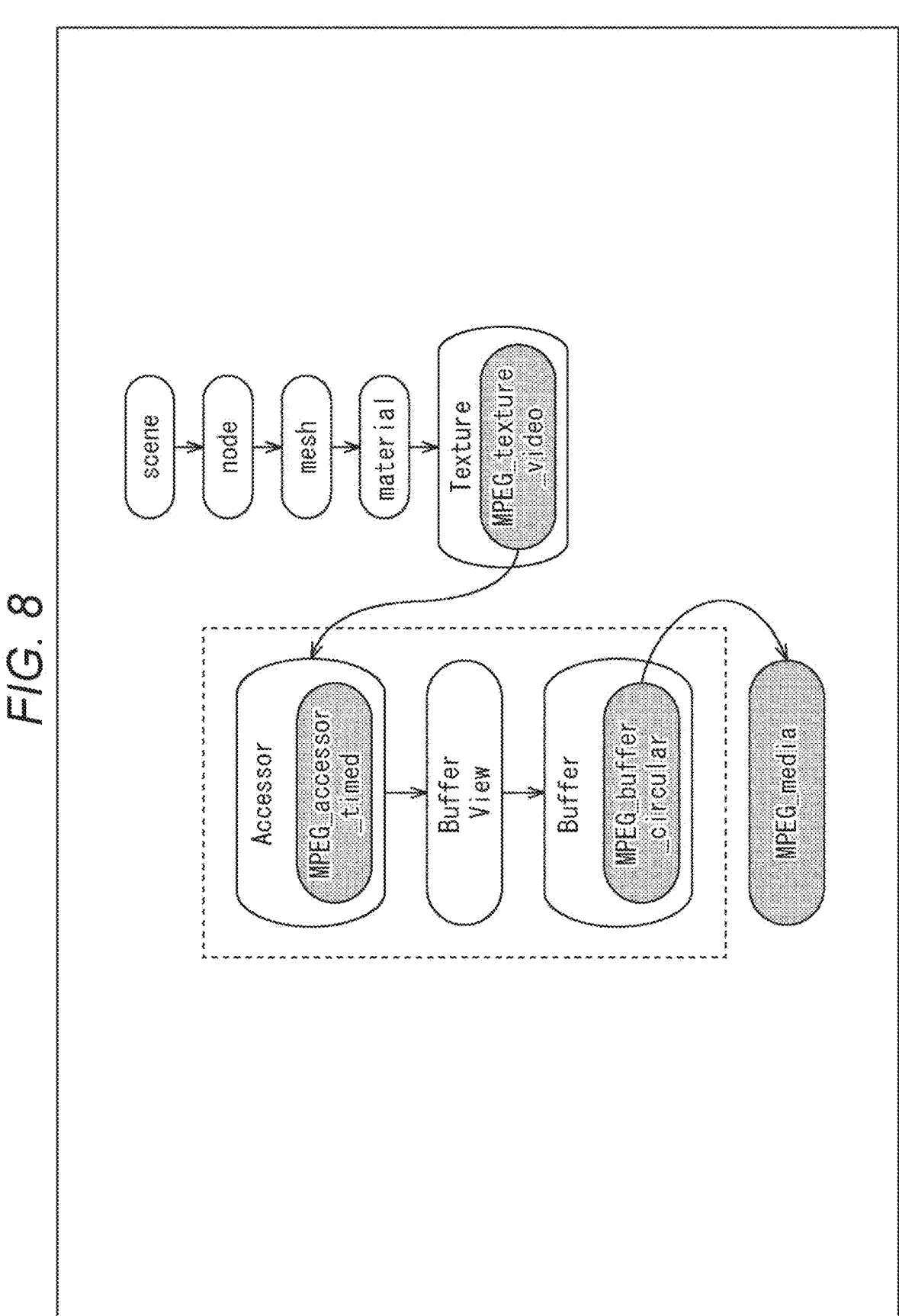
FIG. 8 is a diagram illustrating a configuration example of an extension for handling timed metadata.

FIG. 8 is a diagram for describing the extension for handling timed media. In the example of FIG. 8, the Moving Picture Experts Group (MPEG) media object (MPEG_media) is an extension of glTF, and is an object that designates attributes of, for example, MPEG media such as uri, track, renderingRate, startTime, and the like.

Furthermore, as illustrated in FIG. 8, an MPEG texture video object (MPEG_texture_video) is provided as an extension object (extensions) of the texture object (texture). In the MPEG texture video object, information about an accessor corresponding to a buffer object to be accessed is stored. That is, the MPEG texture video object is an object that designates an index of an accessor (accessor) corresponding to a buffer (buffer) in which texture media (texture media) designated by the MPEG media object (MPEG_media) are decoded and stored. A texture object having an MPEG texture video object is referred to as a video component.

FIG. 9 is a diagram illustrating a description example of an MPEG media object (MPEG_media) and an MPEG texture video object (MPEG_texture_video) in a scene description for describing an extension for handling timed media. In the example of FIG. 9, in the second line from the top, an MPEG texture video object (MPEG_texture_video) is set as an extension object (extensions) of a texture object (texture) as described below. Then, an index of an accessor ("2" in this example) is designated as the value of the MPEG video texture object.

```
"texture":[{"sampler":0, "source":1,
  "extensions":{"MPEG_texture_video":"accessor":2}}],
```

Furthermore, in the case of the example of FIG. 9, in the seventh to 16 lines from the top, an MPEG media object (MPEG_media) is set as an extension object (extensions) of the glTF as described below. Then, as the value of the MPEG media object, for example, various pieces of information related to the MPEG media object such as encoding and URI of the MPEG media object are stored.

```
"MPEG_media":{
  "media":[
  {"name":"source_1", "renderingRate":30.0,
  "startTime":9.0, "timeOffset":0.0,
    "loop":"true", "controls":"false",
    "alternatives":[{"mimeType":"video/mp4;codecs=Y"avc
1.42E01EY"", "uri":"video1.mp4",
    "tracks":[{"track":"#track_ID=1"}]
  }]
  }
  ]
}
```

In addition, each frame data is decoded and sequentially stored in a buffer, but its position and the like fluctuate. Therefore, the scene description has a mechanism to store the fluctuating information so that the renderer (renderer) can read the data. For example, as illustrated in FIG. 8, an MPEG buffer circular object (MPEG buffer circular) is provided as an extension object (extensions) of the buffer object (buffer). Information for dynamically storing data in the buffer object is stored in the MPEG buffer circular object. For example, information such as information indicating the data length of the buffer header (bufferHeader) and information indicating the number of frames is stored in the MPEG buffer circular object. Note that the buffer header stores, for example, information such as an index (index), a time stamp of stored frame data, a data length, and the like.

Furthermore, as illustrated in FIG. 8, an MPEG accessor timed object (MPEG_timed_accessor) is provided as an extension object (extensions) of the accessor object (accessor). In this case, since the media data is a moving image, the buffer view object (bufferView) referred to in the time direction may change (the position may vary). Therefore, information indicating the buffer view object to be referred to is stored in the MPEG accessor timed object. For example, the MPEG accessor timed object stores information indicating a reference to a buffer view object (bufferView) in which a timed accessor information header (timedAccessor information header) is described. Note that the timed accessor information header is, for example, header information that stores information in the dynamically changing accessor object and the buffer view object.

<Pipeline of Dynamic Mesh>

Figure 10:
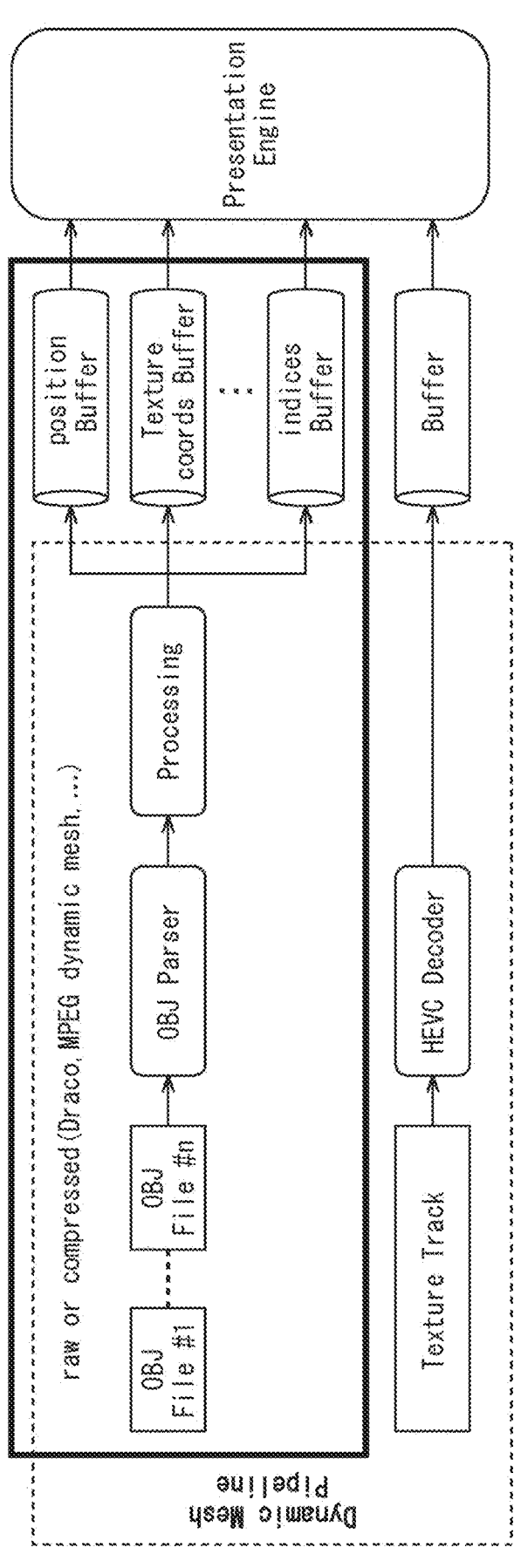
FIG. 10 is a diagram illustrating an example of processing on a dynamic mesh and a texture video in a client.

Non Patent Document 3 discloses processing on a dynamic mesh and a texture video in a client. In the case of a dynamic mesh that is a dynamic mesh, for example, as illustrated in a bold line square frame in FIG. 10, vertex information (position) of the mesh, texture coordinates information (texture coordinates information) indicating a coordinate system of a texture, an index of a vertex, and the like are individually stored in a buffer. Note that these pieces of data may be encoded and stored in the buffer, or may be stored in the buffer without being encoded. A texture video is a dynamic texture (in the present specification, also referred to as mapping) applied to a dynamic mesh. The texture video is encoded by an encoding method for 2D images (for example, high efficiency video coding (HEVC)), is decoded by the encoding method, and is stored in a buffer different from that of the dynamic mesh.

<Setting of Dynamic Mesh Texture>

Figure 11:
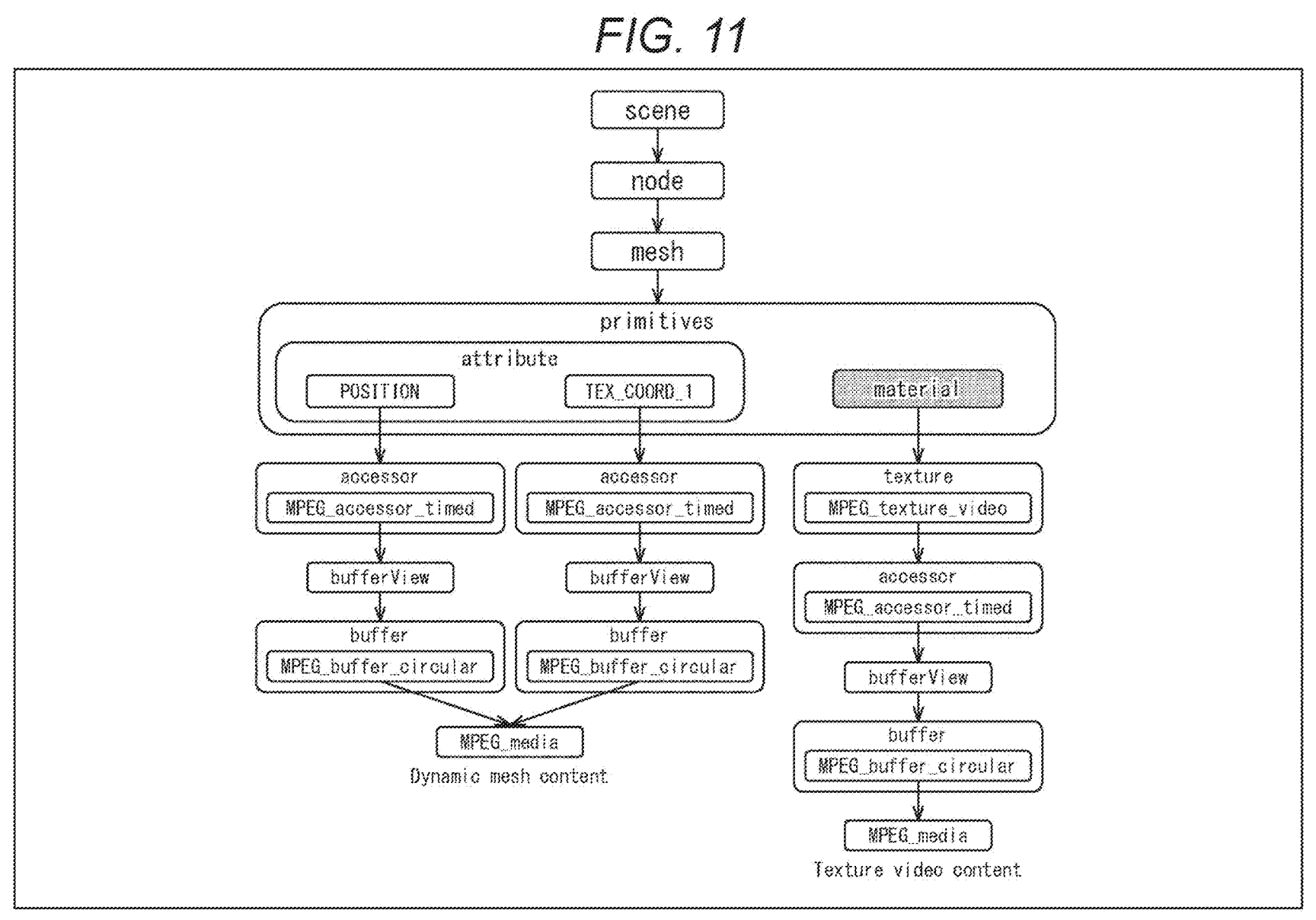

In addition, Non Patent Document 3 discloses a scene description that supports such texture video and dynamic mesh. FIG. 11 illustrates a main configuration example of the object in such a scene description. As illustrated in FIG. 11, the dynamic mesh is stored in a buffer corresponding to an accessor specified in an attribute layer of primitives of a scene description. On the other hand, the texture video is stored in the buffer corresponding to an accessor specified in a material layer of primitives of the scene description. In this way, the dynamic mesh and the texture video are one-to-one. That is, as in the description example illustrated in FIG. 12, in the scene description, information of one texture video is stored in the material layer.

<VD Texture>

Patent Document 1 discloses a VD texture (View Dependent Texture) format for mapping a texture corresponding to a viewpoint on a mesh as a data format of (the texture of) the mesh.

The conventional texture (in the present specification, this is also referred to as View Independent Texture (VI texture) is configured by a texture mapped to the entire one piece of mesh information M as illustrated in the left of FIG. 13. Thus, in the case of the VI texture format, all the textures constituting the VI texture are mapped to the mesh information M without depending on the viewpoint. That is, the texture is mapped to the entire mesh information M regardless of the position and direction of the viewpoint (regardless of whether or not the texture is used for rendering). As illustrated on the left of FIG. 13, at the time of encoding, the VI texture data is formed as a UV texture map stored (also referred to as packing) on a two-dimensional plane of a UV coordinate system for each cluster (also referred to as a patch). That is, in this case, one piece of mesh information M and one UV texture map are encoded in association with each other (that is, the mesh and the texture are associated on a one-to-one basis).

On the other hand, the VD texture is a texture mapped to the mesh according to the viewpoint. For example, as illustrated in the right of FIG. 13, the VD texture includes a captured image (camera video) obtained by capturing an image of a 3D object from a certain viewpoint. At the time of mapping, the captured image (texture) is mapped to the mesh from the direction of the viewpoint. That is, the VD texture includes a texture of a portion of the mesh viewed from the viewpoint. Therefore, in general, the texture of the entire mesh information M cannot be covered by one VD texture, and thus a plurality of VD textures mapped from different directions is associated with one piece of mesh information M as illustrated in the right of FIG. 13. Then, a necessary VD texture (for example, a VD texture close to the viewpoint position of rendering) is selected according to the position and direction of the viewpoint at the time of rendering, and is mapped on the mesh information M.

In general, in a case where the VD texture format and the VI texture format are compared, the load of processing of rendering (mapping) is larger in the VD texture format. However, the load of processing on the encoder side is smaller in the VD texture format. In addition, the code amount is larger in the VD texture format. However, the VD texture format is more suitable for human perception characteristics that tend to place more importance on the resolution and fidelity of the texture than an uneven shape, and the subjective image quality of a rendered display image is high.

Note that a plurality of VD textures can be simultaneously mapped to one mesh. In the present specification, "to simultaneously map" indicates that "a state in which a plurality of VD textures is mapped to one mesh" exists at least at one timing. The timing of mapping each of the plurality of VD textures may be different from each other.

<Packed VD Texture>

Figure 14:
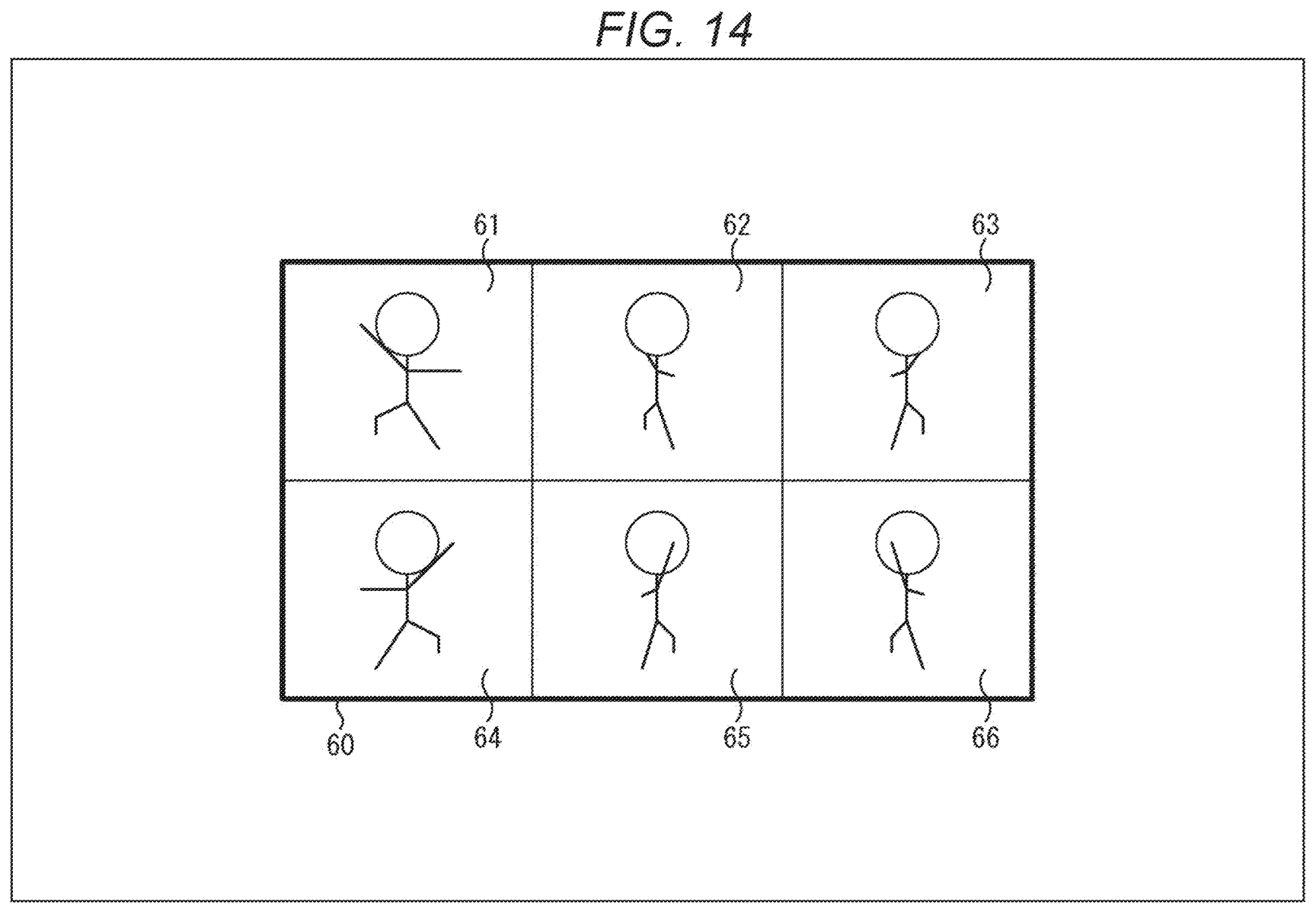

Patent Document 2 discloses a data format called packed VD texture in which a plurality of VD textures is packed in one image and transmitted to a client. For example, in the case of FIG. 14, VD textures 61 to 66 configured by captured images from different viewpoints are packed in a two-dimensional image 60. That is, in the case of the packed VD texture, a plurality of VD textures are encoded as one image. The decoder decodes a bit stream to obtain an image thereof, extracts a desired VD texture (also referred to as unpacking) from the image, and maps the image on a mesh.

In the case of the packed VD texture format, since the VD texture is generally reduced in resolution and packed, the subjective image quality of the display image is lower than that in the case of the VD texture format. Also in the case of the packed VD texture format, a plurality of unpacked VD textures can be simultaneously mapped to one mesh.

In addition, the packed VD texture and the VD texture may be used in combination. For example, the encoder may encode a plurality of VD textures and packed VD textures in association with one mesh. Moreover, in that case, the decoder may map both the VD texture and the unpacked VD texture of the packed VD texture to one mesh.

<Simultaneous Use of Plurality of Video Components>

In recent years, it has been expected that 3D data capable of simultaneously using a plurality of video components for one 3D object, such as the VD texture format and the packed VD texture format, is supported in the MPEG-I Scene Description. Note that, in the present specification, "simultaneous use" indicates that "a state in which a plurality of video components is used for one 3D object" exists at least at one timing. The timing to use each of the plurality of video components may be different from each other. In addition, "to use" indicates that some processing is performed using the video component. For example, "to map a texture to a mesh" can be said "to use a texture".

<Tile>

Figure 15:
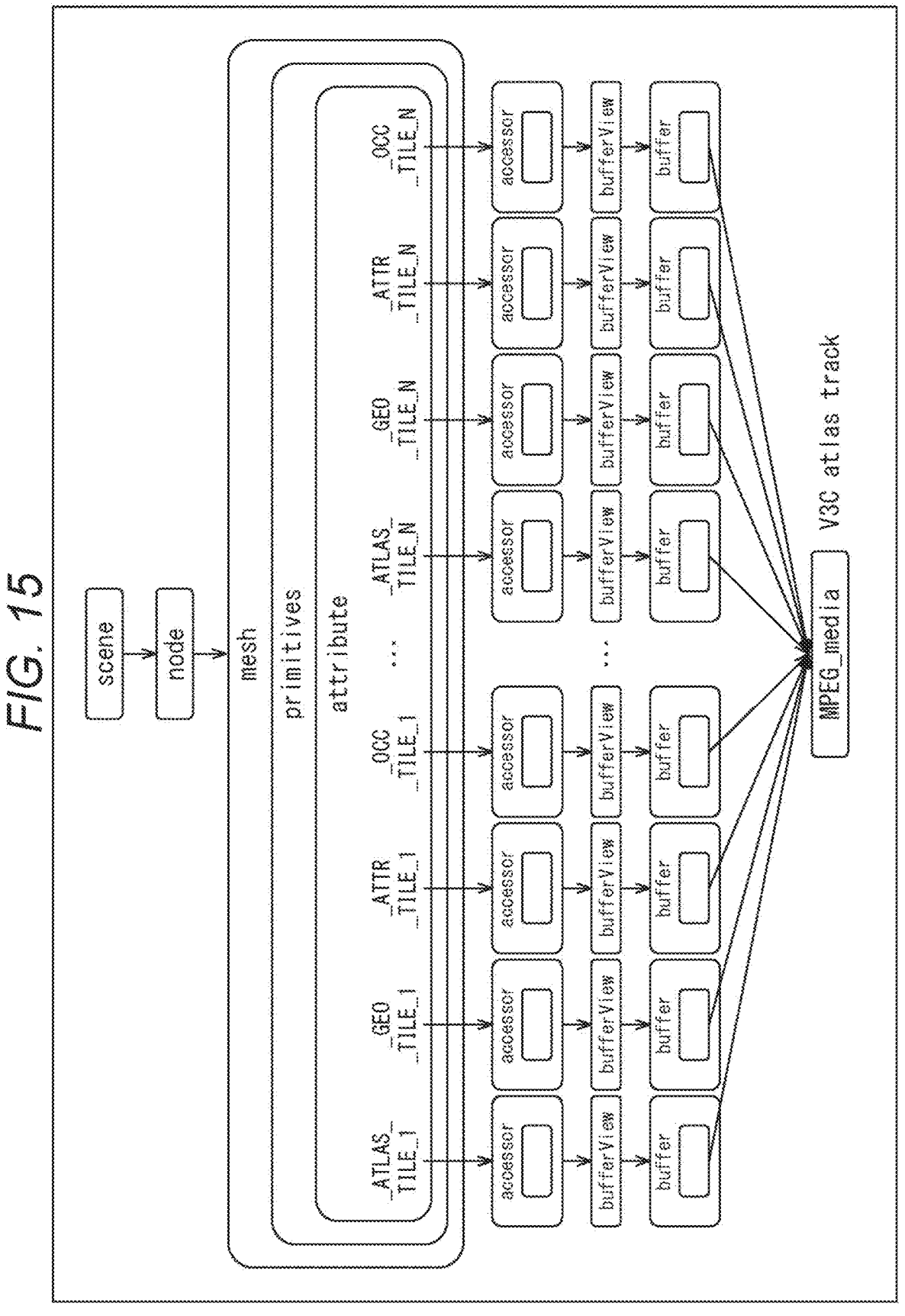
FIG. 15 is a diagram illustrating a configuration example of an object in a scene description supporting a tile structure.

Meanwhile, Non Patent Document 4 discloses a method of associating a mesh with a buffer in units of tiles in a scene description, for example, as illustrated in FIG. 15. In the example of FIG. 15, an extension object is set to each tile in an attribute layer of primitives, and is associated with different accessors. Therefore, in the case of this method, mesh data is stored in different buffers for each tile. Thus, a presentation engine (PE) can select and reconfigure desired tiles.

<Texture Switching>

Furthermore, Non Patent Document 5 discloses, for example, as illustrated in FIG. 16, a method of linking a plurality of textures to a material layer of primitives. In the example of FIG. 16, in the scene description 80, an extension object "MSFT_lod" is set as indicated in a solid line square frame 82, and the texture is hierarchized (converted to LoD) on the basis of the resolution and the like as indicated in a solid line square frame 84 and a solid line square frame 86. Therefore, a basic color information texture (baseColorTexture) is provided with a plurality of LoDs (resolutions) as indicated by a dotted line square frame 81, a dotted square frame 83, and a dotted line square frame 85. Then, different indexes are allocated to each LOD. That is, the texture of each LoD is associated with different accessors. That is, the texture of each LOD is stored in different buffers.

A presentation engine (PE) of the decoder selects and maps any one of the plurality of LoDs. For example, the presentation engine selects any one LOD according to the viewpoint position. In this manner, the presentation engine can switch the LOD of the texture to be mapped, for example, according to a change in the viewpoint position.

<ISOBMFF>

Figure 17:
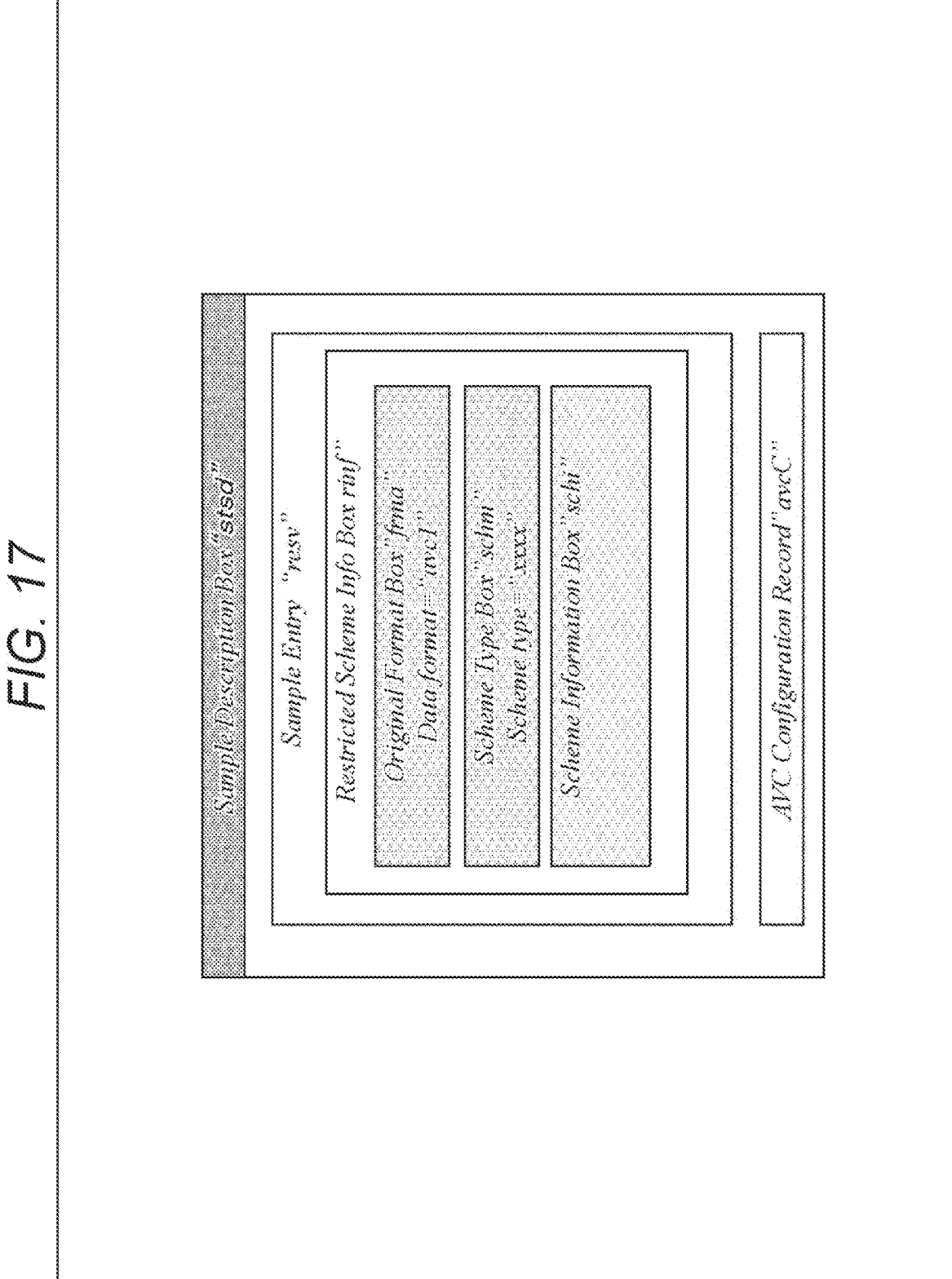
FIG. 17 is a diagram illustrating an example of a box structure of ISOBMFF.

Coded data of a 3D object video including the dynamic mesh and the texture video (for example, the VD texture, the packed VD texture, or the like) as described above may be stored in a file container such as the International Organization for Standardization Base Media File Format (ISOBMFF) illustrated in FIG. 17, for example. ISOBMFF is disclosed in Non Patent Document 6.

<Support for a Plurality of Video Components that can be Used Simultaneously>

However, in the conventional MPEG-I Scene Description, a plurality of video components that can be simultaneously used for one 3D object cannot be described in a scene description.

For example, in the method described in Non Patent Document 4, the dynamic mesh can be associated with different accessors for each tile in the attribute layer of the primitives, but the video component cannot be associated with different accessors in the material layer. Furthermore, in the method described in Non Patent Document 5, a plurality of video components cannot be used at the same time.

3. SCENE DESCRIPTION CORRESPONDING TO A PLURALITY OF VIDEO COMPONENTS

<Method 1>

Therefore, as illustrated at the top of the table in FIG. 18, an extension object (extension) for 3D object video is defined in a material layer of a scene description (SD), and an index is set to each video component in the extension object (Method 1).

For example, an information processing device (for example, a file generation device) includes a file generation unit that generates a scene description file and sets a component index to a video component included in a 3D object video in an extension for the 3D object video defined in a material layer of the scene description file, the component index having a different value for each of the video components. Note that a plurality of video components can be simultaneously used in one 3D object.

Furthermore, in an information processing method (for example, a file generation method), a scene description file is generated, and a component index is set to a video component included in a 3D object video in an extension for the 3D object video defined in a material layer of the scene description file, the component index having a different value for each of the video components. Note that a plurality of video components can be simultaneously used in one 3D object.

For example, an information processing device (for example, a reproduction device) includes a file processing unit that stores a video component included in a 3D object video in a buffer corresponding to the video component on the basis of a component index, and a display image generation unit that acquires the video component from the buffer on the basis of the component index, and generates a display image using the acquired video component. Note that a plurality of video components can be simultaneously used in one 3D object. Furthermore, the component index is set to the video component included in the 3D object video in an extension for the 3D object video defined in a material layer of a scene description, and has a different value for each of the video components.

Furthermore, in an information processing method (for example, a reproduction method), a video component included in a 3D object video is stored in a buffer corresponding to the video component on the basis of a component index, the video component is acquired from the buffer on the basis of the component index, and a display image is generated using the acquired video component. Note that a plurality of video components can be simultaneously used in one 3D object. Furthermore, the component index is set to the video component included in the 3D object video in an extension for the 3D object video defined in a material layer of a scene description, and has a different value for each of the video components.

By describing in this manner in the scene description, a plurality of video components can be associated with different accessors. Therefore, a media access function (MAF) of the reproduction device can store the plurality of video components in different buffers on the basis of the scene description. Consequently, the presentation engine of the reproduction device can select a desired video component and map the selected video component to one object. That is, a plurality of video components can be simultaneously used for one object using the scene description.

<Method 1-1>

In addition, in a case where Method 1 is applied, an index may be set to each VD texture or packed VD texture as illustrated in the second line from the top of the table in FIG. 18 (Method 1-1). That is, a VD texture or a packed VD texture may be applied as the video component.

For example, in the case of the VD texture, "to use" indicates "to map the VD texture". That is, "mapping a plurality of VD textures to one mesh" can be said to be "simultaneously using a plurality of video components". Furthermore, in the case of the packed VD texture, "to use" indicates to "map a plurality of unpacked VD textures from the pack VD textures". That is, "mapping a plurality of unpacked VD textures from the packed VD textures to one mesh" can be said to be "simultaneously using a plurality of video components".

For example, in the above-described information processing device (for example, a file generation device), the video component may be a VD texture that is a captured image obtained by capturing the 3D object from a predetermined viewpoint. In addition, the file generation unit may set the component index to each of a plurality of VD textures included in the 3D object video in an extension thereof.

Furthermore, in the above-described information processing device (for example, the file generation device), the video component may be a packed VD texture in which a plurality of VD textures, which are captured images obtained by capturing the 3D object from a predetermined viewpoint, is packed. In addition, the file generation unit may set the component index to the packed VD texture in the extension.

For example, in the above-described information processing device (for example, a reproduction device), the video component may be a VD texture that is a captured image obtained by capturing the 3D object from a predetermined viewpoint. Furthermore, the file processing unit may store a plurality of the VD textures having the viewpoints different from each other in the buffer corresponding to each of the VD textures on the basis of the component index. In addition, the display image generation unit may acquire the VD texture that is desired from the buffer on the basis of the component index. Then, the display image generation unit may map the acquired VD texture on the 3D object (mesh). Then, the display image generation unit may generate the display image using the 3D data (mesh on which the VD texture is mapped).

Furthermore, in the above-described information processing device (for example, the reproduction device), the video component may be a packed VD texture in which a plurality of VD textures, which are captured images obtained by capturing the 3D object from a predetermined viewpoint, is packed. In addition, the file processing unit may store the packed VD texture in the buffer corresponding to the packed VD texture on the basis of the component index. Furthermore, the display image generation unit may acquire the packed VD texture from the buffer on the basis of the component index. Then, the display image generation unit may unpack a desired VD texture from the acquired packed VD texture. Then, the display image generation unit may map the unpacked VD texture on the 3D object (mesh). Then, the display image generation unit may generate the display image using the 3D data (mesh on which the VD texture is mapped).

Figure 19:
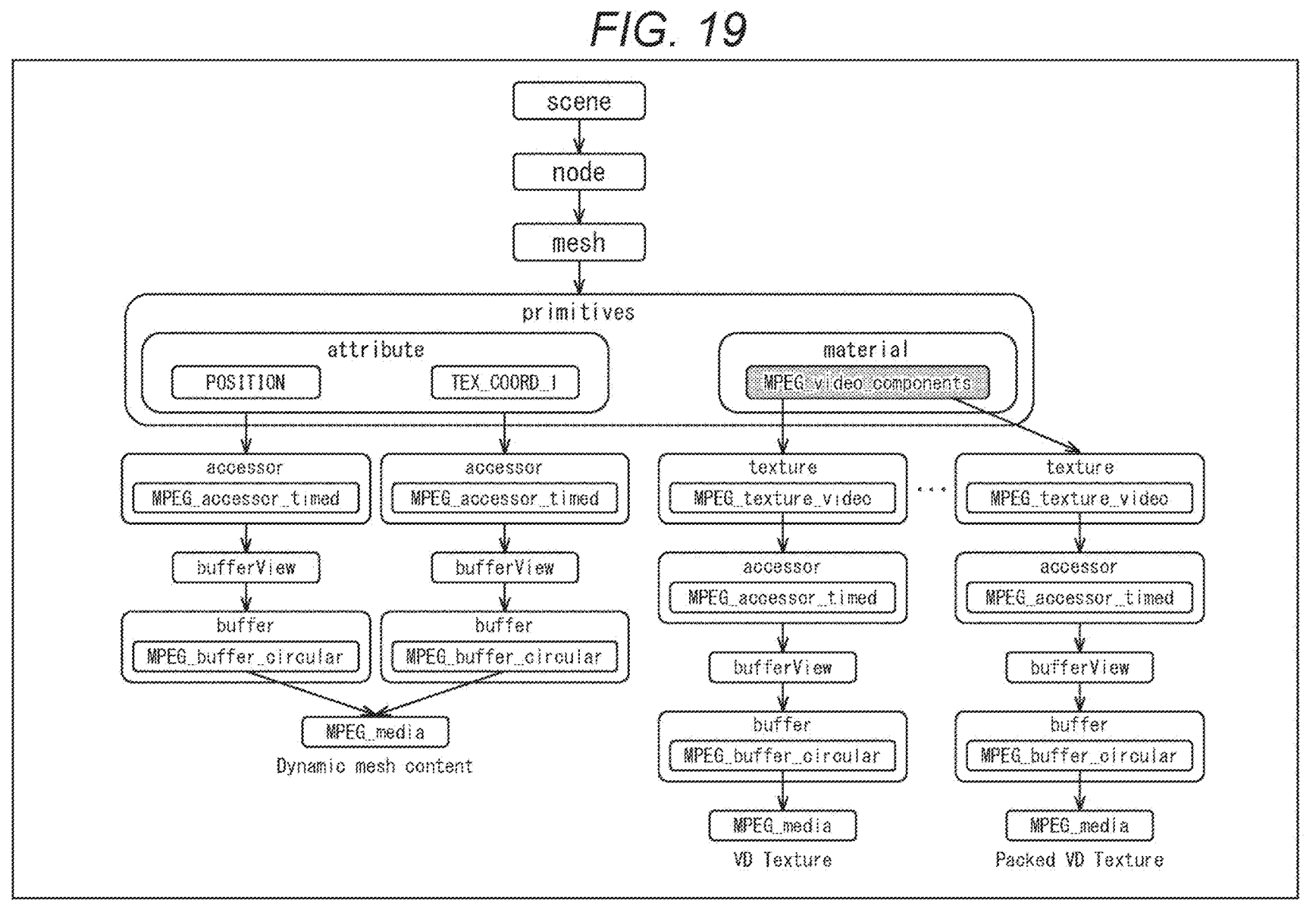

For example, the configuration of the object of the scene description may be as in the example illustrated in FIG. 19. That is, an extension object "MPEG_video_components" for a 3D object video may be provided in the material layer of primitives, and each VD texture or packed VD texture may be associated with different accessors in the MPEG video_components. MPEG_video_components may be provided in the primitives instead of the material layer of the primitives.

Thus, the description of the scene description may be as in the example illustrated in FIG. 20. That is, an index (also referred to as a component index) may be set to each VD texture or packed VD texture. The component index is an index having a different value for each video component as described above. That is, in the examples of FIGS. 19 and 20, the component index has a different value for each VD texture or packed VD texture. In the case of the example of FIG. 20, in a material layer 111, as illustrated in a square frame 112, an index "1" ("index": 1) is set to one VD texture ("vdTexture"), and an index "2" ("index": 2) is set to one packed VD texture ("packedVdTexture"). In a case where there is a plurality of VD textures, component indexes having different values are set to each VD texture.

By describing in this manner in the scene description, each VD texture or packed VD texture can be associated with different accessors as in the example of FIG. 19. Therefore, the media access function (MAF) of the reproduction device can store the each VD texture or packed VD texture in different buffers on the basis of the scene description. Consequently, the presentation engine of the reproduction device can select a desired VD texture or packed VD texture and map the selected VD texture onto the mesh. That is, a plurality of VD textures or packed VD textures can be simultaneously mapped on one mesh using the scene description.

Figure 21:
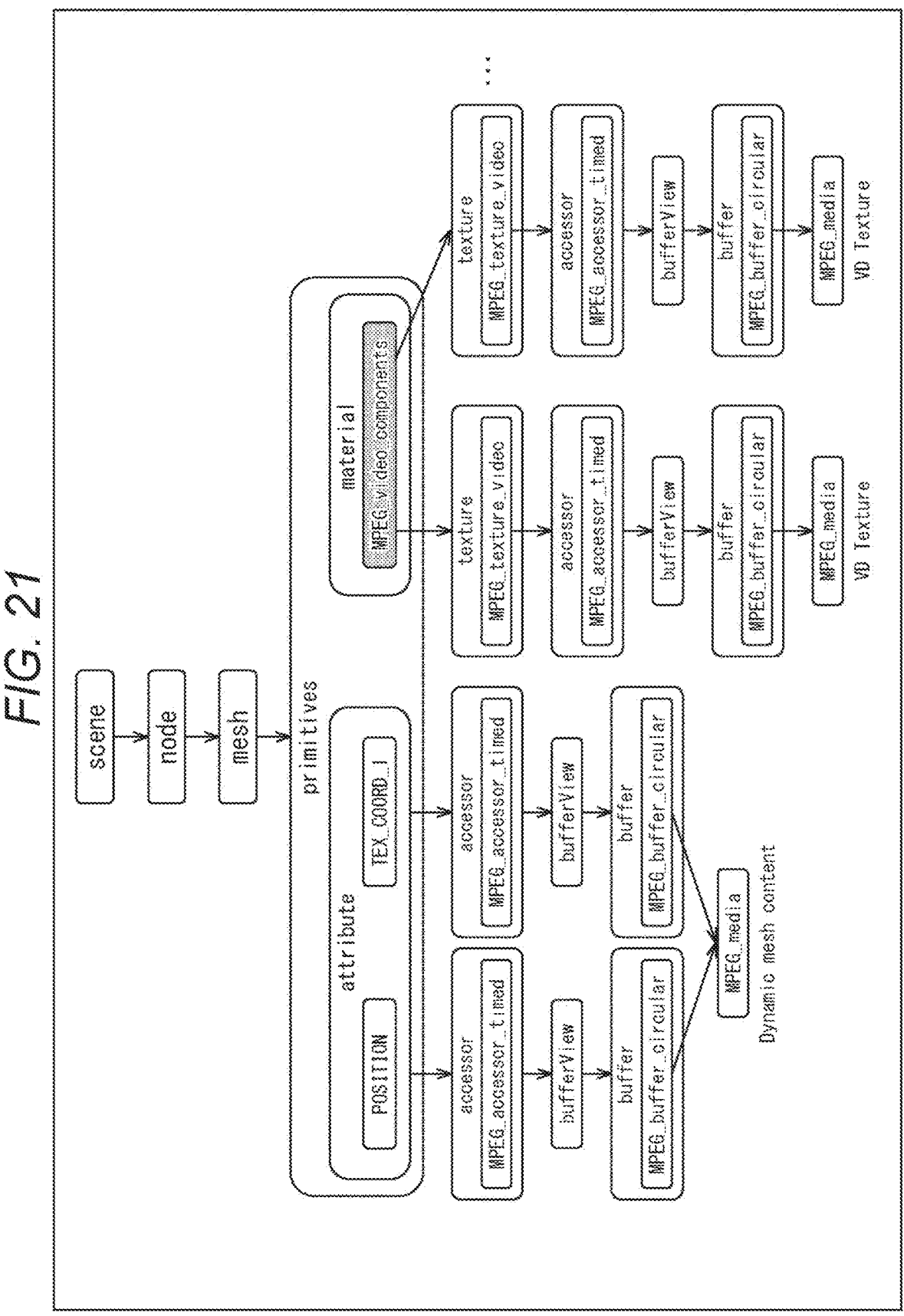
FIG. 21 is a diagram illustrating a configuration example of an object in a scene description supporting a VD texture.

Note that the video component includes only the VD texture, and may not include the packed VD texture. That is, a plurality of VD textures associated with one mesh may be applied as a plurality of video components. In that case, the configuration of the object of the scene description may be as in an example illustrated in FIG. 21. That is, the extension object "MPEG_video_components" for the 3D object video may be provided in the material layer of primitives, and each VD texture may be associated with different accessors in the MPEG_video_components. MPEG_video_components may be provided in the primitives instead of the material layer of the primitives.

Figure 22:
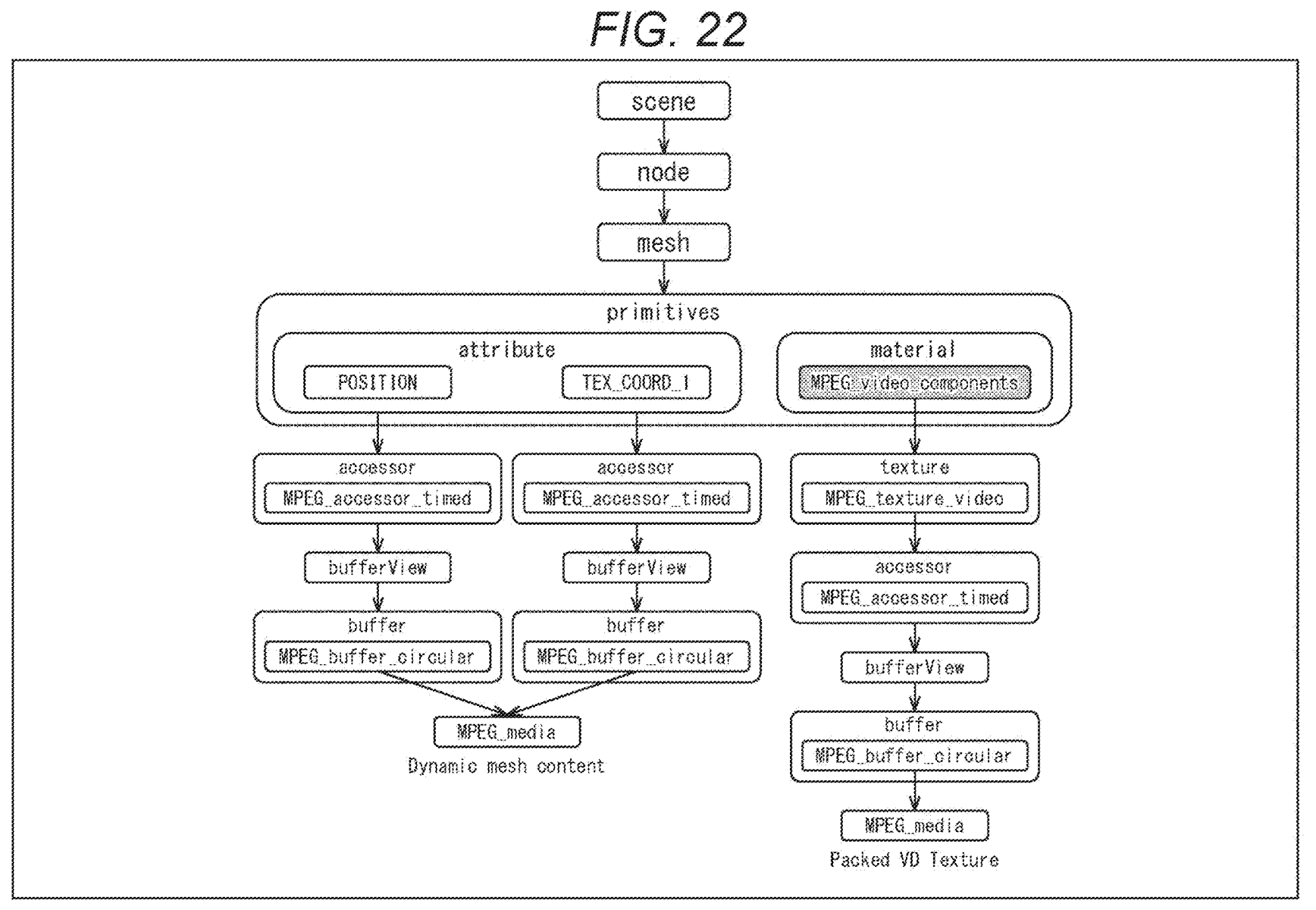

Furthermore, the video component includes only the packed VD texture, and may not include an unpacked VD texture. That is, a packed VD texture in which a plurality of VD textures associated with one mesh is packed is applied as a plurality of video components. In that case, the configuration of the object of the scene description may be as in the example illustrated in FIG. 22. That is, the extension object "MPEG_video_components" for the 3D object video may be provided in the material layer of primitives, and the packed VD texture may be associated with accessors in the MPEG_video_components. MPEG_video_components may be provided in the primitives instead of the material layer of the primitives.

<Method 1-2>

In addition, in a case where Method 1 is applied, an index may be set to each video component (geometry, attribute, or occupancy) of Video-based Point Cloud Compression (V-PCC) as illustrated in the third line from the top of the table in FIG. 18 (Method 1-2). That is, geometry, attribute, and occupancy map of V-PCC may be applied as the video component.

A point cloud is 3D data indicating a 3D shape of an object by a large number of points. The data of the point cloud includes the geometry and attributes of each point. The geometry indicates the position of the point in three-dimensional space (for example, three-dimensional coordinates). The attribute indicates attribute information given to the point. The attribute information may be any information. For example, color information, reflectance information, normal line information, and the like may be included.

V-PCC is one of methods for encoding data of a point cloud. In V-PCC, geometry and attributes are each packed in a two-dimensional plane for each patch and encoded as 2D images (using encoding schemes for 2D images). Note that, in the V-PCC, an occupancy map can be attached to the geometry and attributes. The occupancy map is map information indicating a range in which the geometry (and the attribute) exists in the 2D image. The occupancy map is generated for a 2D image with packed geometry (also referred to herein as a geometry map) and a 2D image with packed attributes (also referred to as an attribute map in the present specification), and the occupancy map is encoded using an encoding scheme for the 2D image, similar to the geometry map and the attribute map. That is, in the case of the V-PCC, the geometry map, the attribute map, and the occupancy map are each configured as a video component. Then, coded data of the point cloud includes coded data of the geometry map, coded data of the attribute map, and coded data of the occupancy map.

At the time of decoding, the coded data of the geometry map, the coded data of the attribute map, and the coded data of the occupancy map are each decoded using an encoding method for a 2D image. Then, (each patch of) the geometry is unpacked from the geometry map, and (each patch of) the attributes is unpacked from the attribute map on the basis of the occupancy map. Then, the point cloud is reconstructed using the unpacked geometry and attributes as described above.

That is, in the case of the V-PCC, "to use" indicates "to reconstruct a point cloud". This point cloud reconstruction is performed using geometry and attributes as described above. In addition, in order to unpack the geometry and the attributes, an occupancy map is used. That is, "a point cloud is reconstructed using a geometry map, an attribute map, and an occupancy map" can be said to be that "a geometry map, an attribute map, and an occupancy map are used simultaneously".

In recent years, it has been considered that a video component (geometry (geometry map), attributes (attribute map), and occupancy map) in a case where such V-PCC is applied is used as a video component, and is associated with accessors in the material layer of the scene description. In this case, as in the case of the VD texture or the packed VD texture described above, a component index may be set to the video component, and each video component may be associated with different accessors. That is, indexes having different values may be set to each of the geometry (geometry map), the attributes (attribute map), and the occupancy map, and the indexes may be associated with different accessors.

For example, in the above-described information processing device (for example, the file generation device), the video component may be a geometry map in which geometry of a point cloud is packed, an attribute map in which attributes of the point cloud are packed, and an occupancy map corresponding to the geometry map and the attribute map. In addition, the file generation unit may set the component index having a different value to each of the geometry map, the attribute map, and the occupancy map in the extension.

For example, in the above-described information processing device (for example, the reproduction device), the video component may be a geometry map in which geometry of a point cloud is packed, an attribute map in which attributes of the point cloud are packed, and an occupancy map corresponding to the geometry map and the attribute map. In addition, the file processing unit may store the geometry map, the attribute map, and the occupancy map in the buffer corresponding to each of the geometry map, the attribute map, and the occupancy map on the basis of the component index. Furthermore, the display image generation unit may acquire the geometry map, the attribute map, and the occupancy map from the buffer on the basis of the component index. Then, the display image generation unit may reconstruct the point cloud using the acquired geometry map, attribute map, and occupancy map. Then, the display image generation unit may generate the display image using the reconstructed point cloud.

<Method 1-3>

In a case where Method 1 is applied and a VD texture is applied as a video component, a camera parameter for the VD texture may be stored (Method 1-3) as illustrated in the fourth line from the top of the table of FIG. 18.

The VD texture may be constituted by a captured image obtained by capturing from a certain viewpoint as described above. A camera parameter that is a parameter related to imaging (camera) for generating the captured image, that is, a camera parameter corresponding to the VD texture may be stored in the scene description. This camera parameter may be used, for example, when mapping the VD texture onto a mesh.

For example, in the above-described information processing device (for example, the file generation device), the file generation unit may further store the camera parameter corresponding to the VD texture in the extension for the 3D object video.

For example, in the above-described information processing device (for example, the reproduction device), the file processing unit may further store the camera parameter corresponding to the VD texture in a buffer corresponding to the VD texture. In addition, the display image generation unit may further acquire the camera parameter corresponding to the desired VD texture from the buffer on the basis of the component index. Then, the display image generation unit may map the VD texture on the 3D object using the acquired camera parameter.

For example, as illustrated in FIG. 23, a camera parameter ("cameraParam") corresponding to the VD texture is set in the extension object "MPEG_video_components" for the 3D object video defined in the material layer. That is, the camera parameter of the VD texture is stored in the buffer.

FIG. 24 illustrates an example of a method of describing the camera parameters in the scene description. As in this example, the camera parameters may include parameters such as cam_id, intrinsic_param, Rs, Ts, distortion, and the like. cam_id is a camera identifier for identifying a camera. intrinsic_param indicates an internal parameter of the camera. Rs and Ts denote external parameters of the camera. For example, Rs represents an attitude of the camera (viewpoint), and Ts represents the position of the camera (viewpoint). Distortion is a parameter indicating an output vector of a distortion coefficient. Of course, the content of the parameter included in the camera parameters stored in the scene description is arbitrary. For example, parameters other than those in the above-described example may be included, or some parameters in the above-described example may be omitted.

A referenced accessor has MPEG_accessor_timed. By setting immutable=TRUE, static data extracted from MPEG media and stored in a buffer can be accessed.

Note that, as illustrated in FIG. 23, an index (accessor index) is set to each VD texture in the camera parameter ("cameraParam"). That is, the camera parameters are stored in different buffers for each VD texture.

As described above, by storing the camera parameters corresponding to (the camera that has generated) the VD texture in the scene description, the reproduction device can more easily map the VD texture onto the mesh on the basis of the camera parameters.

<Method 1-3-1>

Note that, in a case where Method 1-3 is applied, as illustrated in the fifth line from the top of the table in FIG. 18, an index may be set to each of fields of the camera parameter (Method 1-3-1). That is, an index (also referred to as a field index) to each of the fields of the camera parameter, the index having a different value for each of the fields may be set.

For example, in the above-described information processing device (for example, the file generation device), the file generation unit may further set a field index to each of fields of the camera parameter in the extension, the field index having a different value for each of the fields.

For example, in the above-described information processing device (for example, the reproduction device), the file processing unit may store each of fields of the camera parameter in the buffer corresponding to the each of the fields on the basis of a field index. In addition, the display image generation unit may further acquire each of the fields of the camera parameter corresponding to the VD texture that is desired from the buffer on the basis of the field index. Then, the display image generation unit may map the VD texture on the 3D object using the acquired camera parameter. Note that the field index is set to a field of the camera parameter in the extension, and has a different value for each of the fields.

In the example of FIG. 25, an index value "100" is set to the camera identifier cameraId. In addition, an index value "101" is set to the internal parameter intrinsicParam. Further, an index value "102" is set to the external parameter Rs. Furthermore, an index value "103" is set to the external parameter Ts. In addition, an index value "104" is set to an output vector distortion of the distortion coefficient. That is, in the scene description, an index having a different value for each of the fields is set to the camera parameter. In this manner, the media access function of the reproduction device can store these camera parameters in different buffers for each of the fields on the basis of the scene description. Therefore, the presentation engine of the reproduction device can easily acquire a desired field of the camera parameter by selecting a buffer on the basis of the scene description.

<Method 1-4>

Furthermore, in a case where Method 1 is applied and a packed VD texture is applied as a video component, camera parameters and packing metadata of the packed VD texture may be stored as illustrated in the sixth line from the top of the table in FIG. 18 (Method 1-4).

In the packed VD texture, a plurality of VD textures is packed as described above. A camera parameter that is a parameter related to imaging (camera) for generating each VD texture (captured image), that is, a camera parameter corresponding to each VD texture packed in the packed VD texture may be stored in the scene description. This camera parameter may be used, for example, when mapping an unpacked VD texture onto a mesh.

In addition, packing metadata indicating where the VD texture is packed in the packed VD texture and the like may be stored in the scene description. This packing metadata may be used to unpack the VD texture from the packed VD texture, for example.

For example, in the above-described information processing device (for example, the file generation device), the file generation unit may further store the camera parameter and the packing metadata corresponding to the packed VD texture in the extension.

For example, in the above-described information processing device (for example, the reproduction device), the file processing unit may further store the camera parameter and the packing metadata corresponding to the packed VD texture in the buffer corresponding to the packed VD texture. In addition, the display image generation unit may further acquire the camera parameter and the packing metadata corresponding to the packed VD texture from the buffer on the basis of the component index. Then, the display image generation unit may unpack a desired VD texture from the packed VD texture on the basis of the acquired packing metadata. Then, the display image generation unit may map the VD texture on the 3D object using the acquired camera parameter.

For example, as illustrated in FIG. 26, a camera parameter ("packedCameraParam") and packing metadata ("packed-Meta") corresponding to the packed VD texture are set in the extension object "MPEG_video_components" for the 3D object video defined in the material layer. That is, the camera parameters and the packing metadata of the packed VD texture are stored in the buffer.

FIG. 27 illustrates an example of a method of describing the camera parameters in the scene description. Also in this case, the content of the parameter included in the camera parameter is arbitrary. For example, parameters such as cam_id, intrinsic_param, Rs, Ts, and distortion may be included. However, since the packed VD texture includes a plurality of VD textures, the camera parameters corresponding to the packed VD texture include the camera parameters for each of the plurality of VD textures. Therefore, in the example of FIG. 27, unlike the example of FIG. 24, each parameter is indicated for all the cameras (VD texture) using a for loop. Note that the parameter camera_num indicates the number of cameras (VD textures).

FIG. 28 illustrates an example of a method of describing packing metadata in the scene description. The packing metadata includes information such as where each VD texture is packed in the packed VD texture. That is, as in the case of the camera parameters illustrated in FIG. 27, the packing metadata is set such that each parameter is indicated for all the cameras (VD textures) using the for loop. Note that the parameter camera_num indicates the number of cameras (VD textures).

The content of the parameter included in the packing metadata is arbitrary. For example, parameters such as cam_id, src_width[i], src_height[i], src_top[i]. src_left[i], transform_type[i], dst_width[i], dst_height[i], dst_top[i], dst_left[i] may be included. cam_id is a camera identifier for identifying a camera. src_width[i] is a parameter indicating the width (length in the lateral direction) of the corresponding VD texture. src_height[i] is a parameter indicating the height (length in the vertical direction) of the corresponding VD texture. src_top[i] is a parameter indicating the position of the upper end of the corresponding VD texture. src_left[i] is a parameter indicating the position of the left end of the corresponding VD texture. These parameters indicate values of the state unpacked from the packed VD texture. Furthermore, transform type[i] is a parameter indicating arrangement information (rotation or the like) of the packed VD texture.

dst_width[i] is a parameter indicating the width (length in the lateral direction) of the corresponding VD texture. dst_height[i] is a parameter indicating the height (length in the vertical direction) of the corresponding VD texture. dst_top[i] is a parameter indicating the position of the upper end of the corresponding VD texture. dst_left[i] is a parameter indicating the position of the left end of the corresponding VD texture. These parameters indicate the value of the state packed in the packed VD texture.

That is, the packing metadata indicates which portion of the VD texture is stored in which portion of the packed VD texture. Of course, the content of the parameter included in the packing metadata stored in the scene description is arbitrary. For example, parameters other than those in the above-described example may be included, or some parameters in the above-described example may be omitted.

Note that different indexes (accessor indexes) are set to the camera parameter and the packing metadata. In the case of the example of FIG. 26, an index value "200" is set to the camera parameter ("packedCameraParam"), and an index value "201" is set to the packing metadata ("packedMeta"). That is, the camera parameter and the packing metadata are stored in different buffers. The camera parameter is stored in a static buffer, and the packing metadata is stored in a circular buffer. Furthermore, as illustrated in FIG. 27, the camera parameters for all the VD textures packed in the packed VD texture are collectively stored in one buffer. Similarly, as illustrated in FIG. 28, the packing metadata for all the VD textures packed in the packed VD texture is collectively stored in one buffer.

As described above, by storing the packing metadata corresponding to the packed VD texture in the scene description, the reproduction device can more easily unpack the VD texture on the basis of the packing metadata. In addition, by storing the camera parameters corresponding to the packed VD texture in the scene description, the reproduction device can more easily map the VD texture to the mesh on the basis of the camera parameters.

<Method 1-4-1>

Note that, in a case where Method 1-4 is applied, an index may be set to each VD texture packed in the packed VD texture as illustrated in the seventh line from the top of the table in FIG. 18 (Method 1-4-1). That is, an index (also referred to as a VD texture index) may be set to the camera parameter and the packing metadata for each of the VD textures packed in the packed VD texture, the VD texture index having a different value for each of the corresponding VD textures.

For example, in the above-described information processing device (for example, the file generation device), the file generation unit may further set a VD texture index to the camera parameter and the packing metadata for each of the VD textures packed in the packed VD texture in the extension, the VD texture index having a different value for each of the corresponding VD textures.

For example, in the above-described information processing device (for example, the reproduction device), the file processing unit may store the camera parameter and the packing metadata of each of the VD textures packed in the packed VD texture in the buffer corresponding to the each of the VD textures on the basis of the VD texture index. In addition, the display image generation unit may further acquire the camera parameter and the packing metadata corresponding to the desired VD texture from the buffer on the basis of the VD texture index. Then, the display image generation unit may unpack a desired VD texture from the packed VD texture on the basis of the acquired packing metadata. Then, the display image generation unit may map the VD texture on the 3D object using the acquired camera parameter. Note that the VD texture index is set to the camera parameter and the packing metadata for each of the VD textures in the extension described above, and has a different value for each of the corresponding VD textures.

In the example of FIG. 29, an index value "100" is set to a camera parameter ("packedCameraParam_1") corresponding to the first VD texture packed in the packed VD texture. Furthermore, an index value "200" is set to a camera parameter ("packedCameraParam_2") corresponding to the second VD texture packed in the packed VD texture. That is, the VD texture index is set to each camera parameter.

In the case of this example, as described above, the camera parameters are divided for each VD texture. Therefore, the method of describing the camera parameters is independent for each VD texture, for example, as illustrated in FIG. 30. Thus, a for loop using camera_num as in the example of FIG. 27 is unnecessary. Furthermore, since a name capable of identifying the corresponding VD texture is applied as the name of the camera parameter, such as "packedCameraParam_1" and "packedCameraParam_2", cam_id is also unnecessary.

In this manner, the media access function of the reproduction device can store these camera parameters in different buffers for each of the corresponding VD textures on the basis of the scene description. Therefore, the presentation engine of the reproduction device can easily acquire the camera parameter of the desired VD texture by selecting a buffer on the basis of the scene description.

Similarly, an index value "101" is set to the packing metadata ("packedMeta_1") corresponding to the first VD texture packed in the packed VD texture. In addition, an index value "201" is set to packing metadata ("packedMeta_2") corresponding to the second VD texture packed in the packed VD texture. That is, the VD texture index is set to each piece of packing metadata.

In the case of this example, as described above, the packing metadata is divided for each VD texture. Therefore, the method of describing the packing metadata is independent for each VD texture, for example, as illustrated in FIG. 31. Thus, a for loop using camera_num as in the example of FIG. 28 is unnecessary. Furthermore, since a name capable of identifying the corresponding VD texture is applied as the name of the camera parameter, such as "packedMeta_1" and "packedMeta_2", cam_id is also unnecessary.

In this manner, the media access function of the reproduction device can store these pieces of packing metadata in different buffers for each of the corresponding VD textures on the basis of the scene description. Therefore, the presentation engine of the reproduction device can easily acquire the packing metadata of the desired VD texture by selecting the buffer on the basis of the scene description.

<Method 1-4-2>

Note that, in a case where Method 1-4 is applied, an index may be set to each of fields of the camera parameter and the packing metadata as illustrated in the eighth line from the top of the table in FIG. 18 (Method 1-4-2). That is, similarly to the example of FIG. 25, an index (also referred to as a field index) may be set to each of fields of the camera parameter and the packing metadata, the index having a different value for each of the fields.

For example, in the above-described information processing device (for example, the file generation device), the file generation unit may further set a field index to each of fields of the camera parameter and the packing metadata in the extension, the field index having a different value for each of the fields.

For example, in the above-described information processing device (for example, the reproduction device), the file processing unit may store each of fields of the camera parameter and the packing metadata in the buffer corresponding to the each of the fields on the basis of a field index. In addition, the display image generation unit may further acquire each of fields of the camera parameter and the packing metadata corresponding to the VD texture that is desired from the buffer on the basis of the field index. Then, the display image generation unit may unpack a desired VD texture from the packed VD texture on the basis of the acquired packing metadata. Then, the display image generation unit may map the VD texture on the 3D object using the acquired camera parameter. Note that the field index is set to a field of the camera parameter and the packing metadata in the extension, and has a different value for each of the fields.

In this way, the media access function of the reproduction device can store these camera parameters and packing metadata in different buffers for each of the fields on the basis of the scene description. Therefore, the presentation engine of the reproduction device can easily acquire desired fields of the camera parameter and the packing metadata by selecting the buffer on the basis of the scene description.

Note that Method 1-4-1 and Method 1-4-2 described above may be applied in combination. That is, with respect to the camera parameter and the packing metadata, indexes having different values may be set to each of the corresponding VD textures and each of the fields.

In an example of FIG. 32, an index value "101" is set to an internal parameter "instrinsicParam_1" included in a camera parameter corresponding to the VD texture of one eye packed in the packed VD texture. Similarly, an index value "102" is set to an external parameter "Rs_1" corresponding to the VD texture of the one eye. Similarly, an index value "103" is set to an external parameter "Ts_1" corresponding to the VD texture of the one eye. Similarly, an index value "104" is set to the output vector "distortion_1" of the distortion coefficient corresponding to the VD texture of the one eye.

Furthermore, an index value "201" is set to information "src_video_1" regarding the VD texture in an unpacked state from the packed VD texture, which is included in the packing metadata corresponding to the VD texture of one eye packed in the packed VD texture.

Similarly, an index value "202" is set to the arrangement information "transformType_1" of the packed VD texture corresponding to the VD texture of one eye. Similarly, an index value "203" is set to information "dst_video_1" regarding the VD texture in a state of being packed in the packed VD texture corresponding to the VD texture of one eye.

In this manner, the media access function of the reproduction device can store these camera parameters and packing metadata in different buffers for each of the corresponding VD textures and for each of the fields on the basis of the scene description. Therefore, the presentation engine of the reproduction device can easily acquire a desired field of the camera parameter and the packing metadata corresponding to a desired VD texture by selecting the buffer on the basis of the scene description.

Note that, in the case of the example of FIG. 32, accessors for each parameter type of the VD texture captured by the same camera are paired with a name (index_X). For example, the presentation engine of the reproduction device can acquire the camera parameter and the packing metadata corresponding to the first VD texture packed in the packed VD texture by acquiring the field of the name of "XXX_1" (XXX is any character string). That is, the presentation engine of the reproduction device can easily acquire the camera parameter and the packing metadata for each of the corresponding VD textures.

<Method 1-5>

In addition, in a case where Method 1 is applied and a packed VD texture is applied as a video component, the media access function (MAF) may unpack the VD texture from the packed VD texture and store it in a buffer (Method 1-5), as illustrated in the ninth line from the top of the table of FIG. 18.

In this case, the file generation device does not set the packed VD texture object in the material layer of the scene description. The media access function of the reproduction device generates a VD texture from the packed VD texture and stores the VD texture in a circular buffer referenced by the VD texture object in the material layer of the scene description. A presentation engine (PE) only needs to perform processing as in a case where a VD texture is applied as a video component.

For example, in a case where the scene description is set to refer to the same packed VD texture from a plurality of VD textures, the media access function of the reproduction device may perform the processing as described above. That is, the media access function generates a VD texture from the packed VD texture and stores the VD texture in a circular buffer referenced by the VD texture object in the material layer of the scene description.

<Method 1-6>

In addition, in a case where Method 1 is applied and a packed VD texture is applied as a video component, the media access function (MAF) may unpack the VD texture from the packed VD texture, map the VD texture to a 3D object (mesh), generate a VI texture (UV texture map), and store the VD texture in a buffer (Method 1-6), as illustrated in the bottom line of the table in FIG. 18.

In this case, the file generation device does not set the packed VD texture object or the VD texture object in the material layer of the scene description. The media access function of the reproduction device generates a VD texture from the packed VD texture, maps the VD texture to a 3D object (mesh), generates a VI texture (UV texture map), and stores the UV texture map in a circular buffer referenced by the object "MPEG_media". The presentation engine (PE) only needs to perform processing as in a case where VI texture (UV texture map) is applied as a video component.

For example, in a case where an object other than the VD texture is set to refer to the VD texture or the packed VD texture in the material layer of the scene description, the media access function of the reproduction device may perform the processing as described above. The setting of referring to the VD texture or the packed VD texture from an object other than the VD texture may be indicated by track.codecs of the object "MPEG_media". For example, scheme_type of ISOBMFF storing the VD texture may be set to 'vdte', and scheme_type of ISOBMFF storing the packed VD texture may be set to 'pvdt'. In this case, if codecs=resv.vdte.*, it is indicated that a VD texture is stored, and if codecs=resv.pvdt.*, it is indicated that a packed VD texture is stored.

For example, in a case where the scene description is set as illustrated in FIG. 33, codecs=resv.vdte.***, and thus, the VD texture is stored in "vd_tex.mp4". That is, an object other than the VD texture "MPEG_media" is set to refer to the VD texture. Thus, the media access function of the reproduction device performs the process as described above. That is, the media access function generates a VD texture from the packed VD texture, maps the VD texture to a 3D object (mesh), generates a VI texture (UV texture map), and stores the UV texture map in a circular buffer referenced by the object "MPEG_media".

Each method described above may be appropriately combined with another method.

4. FIRST EMBODIMENT

<File Generation Device>

Figure 34:
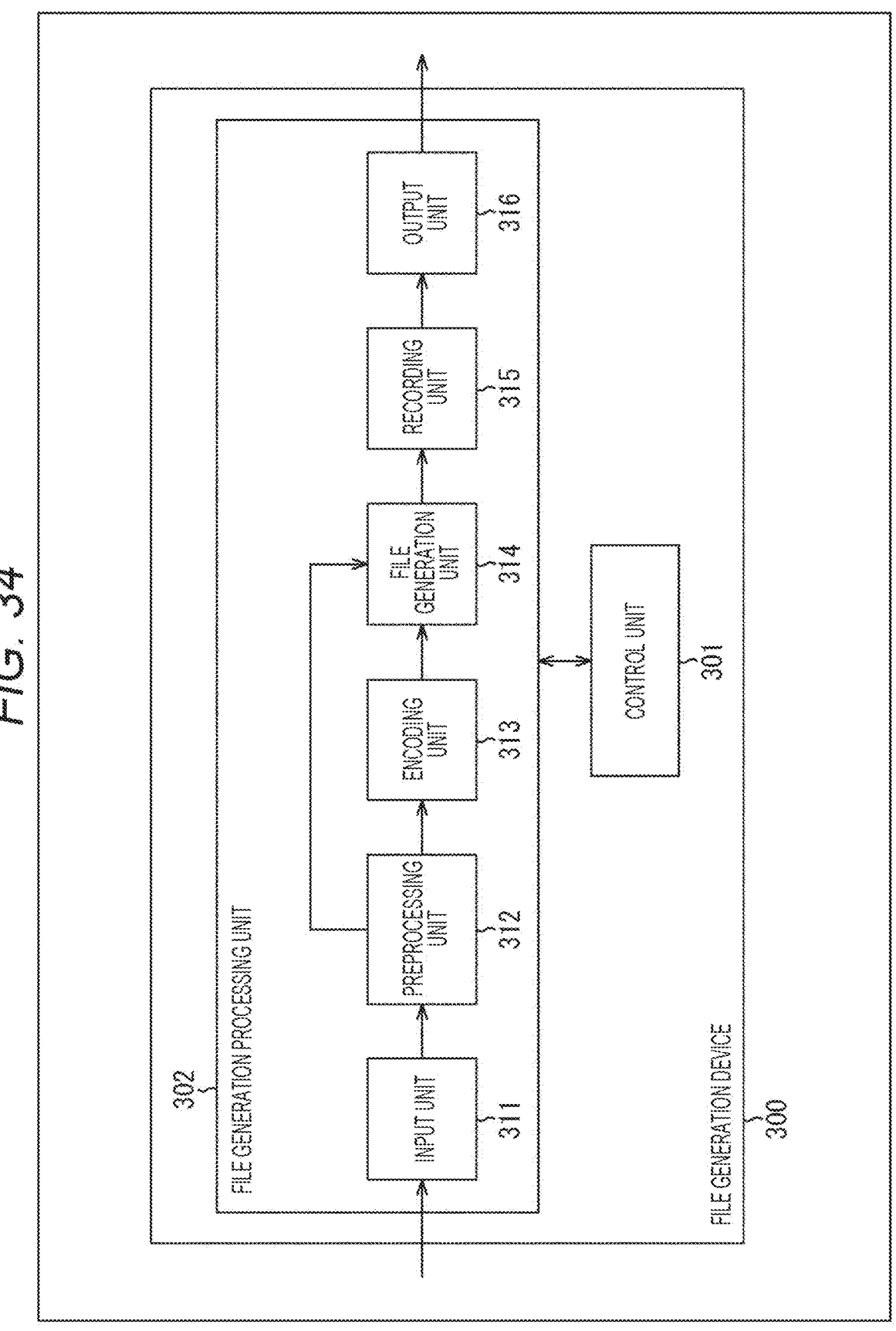
FIG. 34 is a block diagram illustrating a main configuration example of a file generation device.

The above-described present technology can be applied to any device. FIG. 34 is a block diagram illustrating an example of a configuration of a file generation device that is an aspect of the information processing device to which the present technology is applied. A file generation device 300 illustrated in FIG. 34 is a device that encodes 3D object content (for example, 3D data such as a point cloud) and stores the encoded 3D object content in a file container such as an ISOBMFF. In addition, the file generation device 300 generates a scene description file of the 3D object content.

Note that while FIG. 34 illustrates main elements such as processing units and data flows, those illustrated in FIG. 34 do not necessarily include all elements. That is, in the file generation device 300, there may be a processing unit not illustrated as a block in FIG. 34, or there may be processing or a data flow not illustrated as an arrow or the like in FIG. 34.

As illustrated in FIG. 34, the file generation device 300 includes a control unit 301 and a file generation processing unit 302. The control unit 301 controls the file generation processing unit 302. The file generation processing unit 302 is controlled by the control unit 301 and performs a process related to file generation. For example, the file generation processing unit 302 may acquire data of 3D object content to be stored in a file. In addition, the file generation processing unit 302 may generate a content file by storing the acquired data of the 3D object content in a file container. Furthermore, the file generation processing unit 302 may generate a scene description corresponding to the 3D object content and store the scene description in the scene description file. The file generation processing unit 302 may output the generated file to the outside of the file generation device 300. For example, the file generation processing unit 302 may upload the generated file to a distribution server or the like.

The file generation processing unit 302 includes an input unit 311, a preprocessing unit 312, an encoding unit 313, a file generation unit 314, a recording unit 315, and an output unit 316.

The input unit 311 performs processing related to acquisition of data of the 3D object content (3D data representing the three-dimensional structure of the object). For example, the input unit 311 may acquire a 3D object video (dynamic 3D object) including a plurality of video components from the outside of the file generation device 300 as the data of the 3D object content. For example, the video component may be a VD texture, a packed VD texture, or both. For example, the input unit 311 may acquire a dynamic mesh and a plurality of VD texture videos (dynamic VD textures). In addition, the input unit 311 may acquire the dynamic mesh, the plurality of VD texture videos, and the packed VD texture video (dynamic packed VD texture). Furthermore, the video component may be a video component (geometry, attributes, and occupancy map) of the V-PCC. Of course, the video component may be any data as long as a plurality of video components can be simultaneously used in one 3D object, and is not limited to these examples. The input unit 311 may supply the acquired data of the 3D object content to the preprocessing unit 312.

The preprocessing unit 312 performs a process related to preprocessing performed on the data of the 3D object content before encoding. For example, the preprocessing unit 312 may acquire the data of the 3D object content supplied from the input unit 311. Further, the preprocessing unit 312 may acquire information necessary for generating a scene description from the acquired data of the 3D object content or the like. Furthermore, the preprocessing unit 312 may supply the acquired information to the file generation unit 314. In addition, the preprocessing unit 312 may supply data of the 3D object content to the encoding unit 313.

The encoding unit 313 performs a process related to encoding of data of the 3D object content. For example, the encoding unit 313 may acquire the data of the 3D object content supplied from the preprocessing unit 312. In addition, the encoding unit 313 may encode the acquired data of the 3D object content and generate the coded data.

For example, in a case where the dynamic mesh and the plurality of VD texture videos are supplied, the encoding unit 313 may encode each of the dynamic mesh and the plurality of VD texture videos. At that time, the encoding unit 313 encodes the VD texture video using an encoding method for 2D images. Note that, in a case where the packed VD texture video is supplied, the encoding unit 313 may encode the packed VD texture video. At that time, the encoding unit 313 encodes the packed VD texture video using an encoding method for 2D images.

In addition, the encoding unit 313 may supply the coded data of the generated 3D object content to the file generation unit 314.

The file generation unit 314 performs a process related to generation of a file or the like. For example, the file generation unit 314 may acquire the coded data of the 3D object content supplied from the encoding unit 313. Furthermore, the file generation unit 314 may acquire information supplied from the preprocessing unit 312. In addition, the file generation unit 314 may generate a file container (content file) that stores the coded data of the 3D object content supplied from the encoding unit 313. The specification and the like of the content file (file container) are arbitrary, and any file may be used as long as the coded data of the 3D object content can be stored. For example, it may be an ISOBMFF.

In addition, the file generation unit 314 may generate a scene description corresponding to the coded data of the 3D object content by using the information supplied from the preprocessing unit 312. Then, the file generation unit 314 may generate a scene description file and store the generated scene description. Furthermore, the file generation unit 314 may supply the generated file or the like (ISOBMFF, scene description file, and the like) to the recording unit 315.

The recording unit 315 includes any recording medium such as a hard disk or a semiconductor memory, for example, and performs a process related to data recording. For example, the recording unit 315 may record the file or the like supplied from the file generation unit 314 in the recording medium. In addition, the recording unit 315 may read a file or the like recorded in the recording medium in accordance with a request from the control unit 301 or the output unit 316 or at a predetermined timing, and supply the file or the like to the output unit 316.

The output unit 316 may acquire the file or the like supplied from the recording unit 315 to output the file or the like to the outside of the file generation device 300 (for example, a distribution server, a reproduction device, or the like).

In the file generation device 300 having the above configuration, the present technology described above may be applied in <3. Scene description corresponding to a plurality of video components>.

For example, Method 1 may be applied, and the file generation unit 314 may generate a scene description file and set a component index to a video component included in a 3D object video in an extension for the 3D object video defined in a material layer of the scene description file, the component index having a different value for each of the video components. Note that a plurality of the video components can be simultaneously used in one 3D object.

In addition, Method 1-1 may be applied in a case where Method 1 is applied, and the video component may be a VD texture that is a captured image obtained by capturing the 3D object from a predetermined viewpoint. Then, in the extension for the 3D object video described above, the file generation unit 314 may set the component index for each of the plurality of VD textures included in the 3D object video.

In addition, Method 1-3 may be applied in a case where Method 1 is applied and a VD texture is applied as a component, and the file generation unit 314 may further store a camera parameter corresponding to the VD texture in the extension for the 3D object video described above.

In addition, Method 1-3-1 may be applied in a case where Method 1-3 is applied, and the file generation unit 314 may further set a field index to each of fields of the camera parameter in the extension for the 3D object video described above, the field index having a different value for each of the fields.

Furthermore, Method 1-1 may be applied in a case where Method 1 is applied, and the video component may be a packed VD texture in which a plurality of VD textures, which are captured images obtained by capturing the 3D object from a predetermined viewpoint, is packed. Then, the file generation unit 314 may set the component index to the packed VD texture in the extension for the 3D object video described above.

Furthermore, Method 1-4 may be applied in a case where Method 1 is applied and a packed VD texture is applied as a component, and the file generation unit 314 may further store camera parameters and packing metadata corresponding to the packed VD texture in the extension for the 3D object video described above.

In addition, Method 1-4-1 may be applied in a case where Method 1-4 is applied, and the file generation unit 314 may further set a VD texture index to the camera parameter and the packing metadata for each of the VD textures packed in the packed VD texture in the extension for the 3D object video described above, the VD texture index having a different value for each of the corresponding VD textures.

In addition, Method 1-4-2 may be applied in a case where Method 1-4 is applied, and the file generation unit 314 may further set a field index to each of fields of the camera parameter and the packing metadata in the extension for the 3D object video described above, the field index having a different value for each of the fields.

In addition, Method 1-2 may be applied in a case where Method 1 is applied, and the video component may be a geometry map in which geometry of a point cloud is packed, an attribute map in which attributes of the point cloud are packed, and an occupancy map corresponding to the geometry map and the attribute map. Then, in the extension for the 3D object video described above, the file generation unit 314 may set component indexes having different values for each of the geometry map, the attribute map, and the occupancy map.

Of course, the other present technologies described above may be applied in <3. Scene description corresponding to a plurality of video components>. In addition, a plurality of the present technologies may be appropriately combined and applied.

With such a configuration, the file generation device 300 can generate a scene description associating a plurality of video components simultaneously available for one object with different accessors. Therefore, the reproduction device can simultaneously use a plurality of video components for one object by using the scene description.

<Flow of File Generation Processing>

Figure 35:
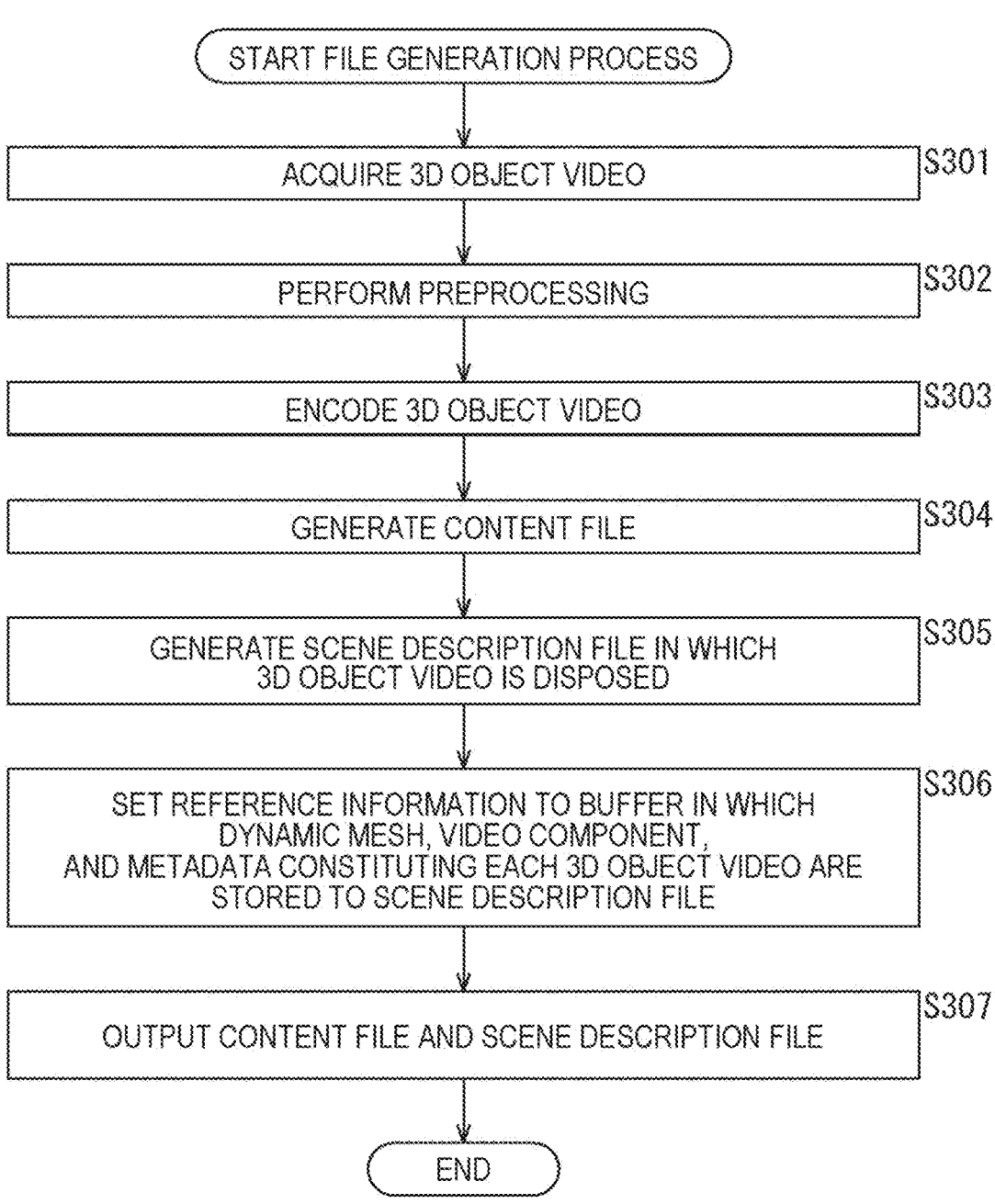
FIG. 35 is a flowchart illustrating an example of a flow of file generation processing.

An example of a flow of file generation processing executed by the file generation device 300 having such a configuration by applying the above-described Method 1 will be described with reference to a flowchart of FIG. 35.

When the file generation process is started, the input unit 311 of the file generation device 300 acquires the 3D object video (dynamic 3D data) in step S301. For example, the input unit 311 acquires a 3D object video including a plurality of video components as 3D data thereof.

In step S302, the preprocessing unit 312 performs preprocessing on the 3D object video. For example, the preprocessing unit 312 acquires, from the 3D object video, information to be used for generating a scene description, which is spatial arrangement information for disposing one or more 3D objects in a 3D space.

In step S303, the file generation unit 314, the encoding unit 313 encodes the 3D object video acquired in step S301, and generates the coded data.

In step S304, the file generation unit 314 generates a content file (for example, ISOBMFF) that stores the coded data.

In step S305, the file generation unit 314 generates a scene description file. The scene description file stores a scene description in which a 3D object represented by the 3D object video acquired in step S301 is disposed in a 3D space.

In step S306, the file generation unit 314 sets reference information to each buffer in which data constituting the 3D object video is stored in the scene description. The 3D object video includes a dynamic mesh, a plurality of video components, metadata, and the like. The file generation unit 314 sets reference information to each buffer in the scene description so as to store these pieces of configuration data (dynamic mesh, each video component, and metadata) in different buffers. For example, the file generation unit 314 may apply Method 1 and set a component index to a video component included in a 3D object video in an extension for the 3D object video defined in a material layer of the scene description file, the component index having a different value for each of the video components. Note that a plurality of the video components can be simultaneously used in one 3D object.

In step S307, the recording unit 315 records the generated scene description file and the generated content file in the recording medium. The output unit 316 reads the scene description file, the content file, and the like from the recording medium, and outputs the read file to the outside of the file generation device 300 at a predetermined timing. For example, the output unit 316 may transmit (upload) the scene description file and the content file to another device such as a distribution server or a reproduction device via a communication medium such as a network. In addition, the output unit 316 may record the scene description file and the content file in an external recording medium such as a removable medium. In this case, the output file may be supplied to another device (a distribution server, a reproduction device, or the like) via the external recording medium, for example.

When the process of step S307 ends, the file generation processing ends.

By executing the file generation process in this manner, the file generation device 300 can generate a scene description that associates a plurality of video components that can be simultaneously used for one object with different accessors. Therefore, the reproduction device can simultaneously use a plurality of video components for one object by using the scene description.

Note that Method 1-1 may be applied, and the video component may be a VD texture that is a captured image obtained by capturing the 3D object from a predetermined viewpoint. Then, in step S306, the file generation unit 314 may set the component index to each of the plurality of VD textures included in the 3D object video in the extension for the 3D object video described above.

In addition, Method 1-3 may be applied in a case where Method 1-1 is applied, and in step S306, the file generation unit 314 may further store the camera parameter corresponding to the VD texture in the extension for the 3D object video described above.

In addition, Method 1-3-1 may be applied in a case where Method 1-3 is applied, and in step S306, the file generation unit 314 may further set a field index to each of fields of the camera parameter in the extension for the 3D object video described above, the field index having a different value for each of the fields.

In addition, Method 1-1 may be applied, and the video component may be a packed VD texture in which a plurality of VD textures, which are captured images obtained by capturing the 3D object from a predetermined viewpoint, is packed. Then, in step S306, the file generation unit 314 may set the component index to the packed VD texture in the extension for the 3D object video described above.

Furthermore, Method 1-4 may be applied in a case where Method 1-1 is applied, and in step S306, the file generation unit 314 may further store the camera parameter and the packing metadata corresponding to the packed VD texture in the extension for the 3D object video described above.

In addition, Method 1-4-1 may be applied in a case where Method 1-4 is applied, and in step S306, the file generation unit 314 may further set a VD texture index to the camera parameter and the packing metadata for each of the VD textures packed in the packed VD texture in the extension for the 3D object video described above, the VD texture index having a different value for each of the corresponding VD textures.

In addition, Method 1-4-2 may be applied in a case where Method 1-4 is applied, and in step S306, the file generation unit 314 may further set a field index to each of fields of the camera parameter and the packing metadata in the extension for the 3D object video described above, the field index having a different value for each of the fields.

In addition, Method 1-2 may be applied, and the video component may be a geometry map in which geometry of a point cloud is packed, an attribute map in which attributes of the point cloud are packed, and an occupancy map corresponding to the geometry map and the attribute map. Then, in step S306, the file generation unit 314 may set component indexes having different values for each of the geometry map, the attribute map, and the occupancy map in the extension for the 3D object video described above.

Of course, the other present technologies described above may be applied in <3. Scene description corresponding to a plurality of video components>. In addition, a plurality of the present technologies may be appropriately combined and applied.

5. SECOND EMBODIMENT

<Client Device>

Figure 36:
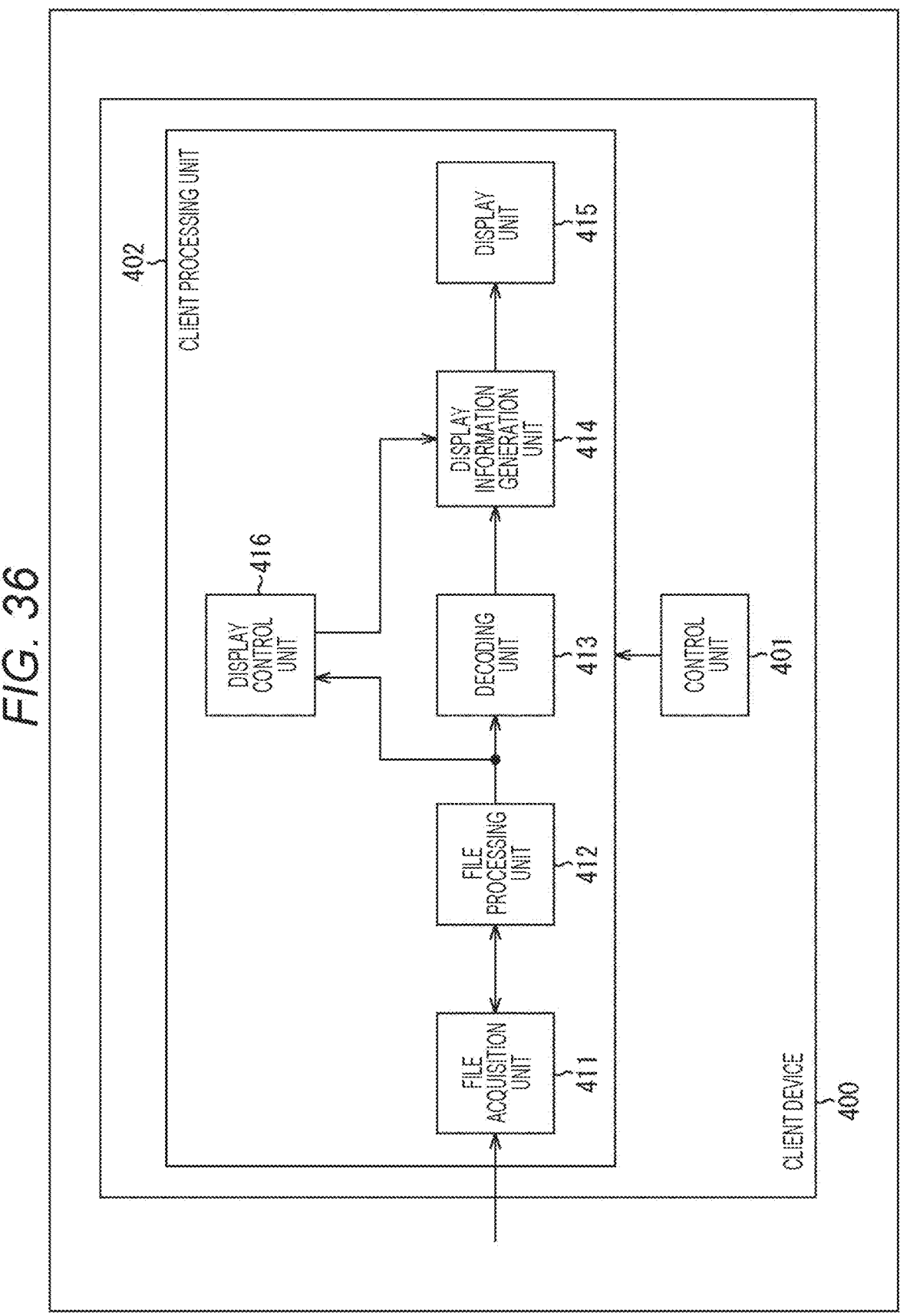
FIG. 36 is a block diagram illustrating a main configuration example of a client device.

FIG. 36 is a block diagram illustrating an example of a configuration of the client device that is an aspect of the information processing device to which the present technology is applied. A client device 400 illustrated in FIG. 36 is a reproduction device that performs a reproduction processing of 3D object content on the basis of the scene description. For example, the client device 400 reproduces the data of the 3D object stored in the content file generated by the file generation device 300. At this time, the client device 400 performs a process related to the reproduction on the basis of the scene description.

Note that while FIG. 36 illustrates main elements such as processing units and data flows, those illustrated in FIG. 36 do not necessarily include all elements. That is, in the client device 400, there may be a processing unit not illustrated as a block in FIG. 36, or there may be processing or a data flow not illustrated as an arrow or the like in FIG. 36.

As illustrated in FIG. 36, the client device 400 includes a control unit 401 and a reproduction processing unit 402. The control unit 401 performs processing related to control for the reproduction processing unit 402. The reproduction processing unit 402 performs a process related to reproduction of the data of the 3D object.

The reproduction processing unit 402 includes a file acquisition unit 411, a file processing unit 412, a decoding unit 413, a display information generation unit 414, a display unit 415, and a display control unit 416.

The file acquisition unit 411 performs a process related to file acquisition. For example, the file acquisition unit 411 may acquire a file or the like supplied from the outside of the client device 400, such as the distribution server or the file generation device 300. In addition, the file acquisition unit 411 may acquire a file or the like stored in a local storage (not illustrated). For example, the file acquisition unit 411 may acquire a scene description file. In addition, the file acquisition unit 411 may acquire a content file. For example, the file acquisition unit 411 may supply the acquired file to the file processing unit 412. The file acquisition unit 411 may perform a process related to the acquisition of the file under the control of the file processing unit 412. For example, the file acquisition unit 411 may acquire a file requested by the file processing unit 412 from the outside or a local storage and supply the file to the file processing unit 412.

The file processing unit 412 performs a process related to processing on a file or the like. For example, the file processing unit 412 may have the function of the media access function (MAF) 52 in the configuration described with reference to FIG. 7, and may execute the processing described as the processing executed by the media access function 52.

For example, the file processing unit 412 may control the file acquisition unit 411 under the control of the display information generation unit 414 to acquire the scene description file from the outside of the client device 400, a local storage, or the like. Furthermore, the file processing unit 412 may supply the scene description file to the display information generation unit 414. In addition, the file processing unit 412 may control the file acquisition unit 411 under the control of the display information generation unit 414 to acquire data (for example, the coded data of the 3D object video, or the like) stored in a content file outside the client device 400 or in a local storage.

In addition, the file processing unit 412 may supply the coded data of the 3D object video or the like to the decoding unit 413 to undergo decoding, and store the obtained data in a buffer (corresponding to the buffer 54 in FIG. 7) (not illustrated). That is, it can be said that the file processing unit 412 substantially stores this data in a buffer (not illustrated) (corresponding to the buffer 54 in FIG. 7).

In addition, the file processing unit 412 may supply information regarding image display (for example, scene description or the like) to the display control unit 416.

The decoding unit 413 performs a process related to decoding. For example, the decoding unit 413 may have the function of the pipeline 53 (decoder) in the configuration described with reference to FIG. 7 and may execute the processing described as the processing executed by the pipeline 53 (decoder).

For example, the decoding unit 413 may decode the coded data of the 3D object video or the like supplied from the file processing unit 412 under the control of the file processing unit 412 (media access function 52). Furthermore, under the control of the file processing unit 412 (media access function 52), the decoding unit 413 may store data (video components and the like) obtained by the decoding in a buffer (corresponding to the buffer 54 in FIG. 7) which is not illustrated. At that time, the decoding unit 413 stores data (video component or the like) obtained by the decoding in a buffer associated with the data by the scene description.

The display information generation unit 414 performs processing related to generation of a display image under the control of the display control unit 416. Therefore, the display information generation unit 414 can also be referred to as a display image generation unit. For example, the display information generation unit 414 may have the function of the presentation engine (PE) 51 in the configuration described with reference to FIG. 7 and may execute the processing described as the processing executed by the presentation engine 51.

For example, the display information generation unit 414 may control the file processing unit 412 (media access function 52) to acquire the scene description file. In addition, the display information generation unit 414 may control the file processing unit 412 (media access function 52) on the basis of the scene description stored in the scene description file to acquire desired data (for example, the coded data of the 3D object video, and the like) stored in the content file.

Furthermore, the display information generation unit 414 may acquire desired data from a buffer (corresponding to the buffer 54 in FIG. 7) (not illustrated) on the basis of the scene description. In addition, the display information generation unit 414 may reconstruct the 3D object video (3D data) using the acquired data. Furthermore, the display information generation unit 414 may perform rendering using the 3D object video to generate a display image. This display image is a 2D image of the 3D object viewed from a designated viewpoint position. Furthermore, the display information generation unit 414 may supply the generated display information to the display unit 415 to display.

The display unit 415 includes a display device and performs a process related to image display. For example, the display unit 415 may acquire the display information supplied from the display information generation unit 414 and display the display information by using the display device.

The display control unit 416 performs a process related to image display control. For example, the display control unit 416 may acquire information such as a scene description supplied from the file processing unit 412. Furthermore, the display control unit 416 may control the display information generation unit 414 on the basis of the information.

In the client device 400 having the above configuration, the present technology described in <3. Scene description corresponding to a plurality of video components> may be applied.

For example, Method 1 may be applied, and the file processing unit 412 may store the video component included in the 3D object video in a buffer corresponding to the video component on the basis of the component index. In addition, the display information generation unit 414 may acquire the video component from the buffer on the basis of the component index, and generate a display image using the acquired video component.

In addition, Method 1-1 may be applied in a case where Method 1 is applied, and the video component may be a VD texture that is a captured image obtained by capturing the 3D object from a predetermined viewpoint. Then, the file processing unit 412 may store a plurality of the VD textures having the viewpoints different from each other in the buffer corresponding to each of the VD textures on the basis of the component index. In addition, the display information generation unit 414 may acquire the VD texture that is desired from the buffer on the basis of the component index. Then, the display information generation unit 414 may map the acquired VD texture onto a 3D object (mesh). Then, the display information generation unit 414 may generate the display image using the 3D data (mesh on which the VD texture is mapped).

Furthermore, Method 1-3 may be applied in a case where Method 1 is applied and a VD texture is applied as a component, and the file processing unit 412 may further store a camera parameter corresponding to the VD texture in the buffer corresponding to the VD texture. In addition, the display information generation unit 414 may further acquire the camera parameter corresponding to the VD texture that is desired from the buffer on the basis of the component index. Then, the display information generation unit 414 may map the VD texture on the 3D object using the acquired camera parameter.

Furthermore, Method 1-3-1 may be applied in a case where Method 1-3 is applied, and the file processing unit 412 may store each of fields of the camera parameter in the buffer corresponding to the each of the fields on the basis of a field index. In addition, the display information generation unit 414 may further acquire each of the fields of the camera parameter corresponding to the VD texture that is desired from the buffer on the basis of the field index. Then, the display information generation unit 414 may map the VD texture on the 3D object using the acquired camera parameter. Note that the field index is set to the fields of the camera parameter in the extension for the 3D object video described above, and has a different value for each of the fields.

Furthermore, Method 1-1 may be applied in a case where Method 1 is applied, and the video component may be a packed VD texture in which a plurality of VD textures, which are captured images obtained by capturing the 3D object from a predetermined viewpoint, is packed. In addition, the file processing unit 412 may store the packed VD texture in the buffer corresponding to the packed VD texture on the basis of the component index. Furthermore, the display information generation unit 414 may acquire the packed VD texture from the buffer on the basis of the component index. Then, the display information generation unit 414 may unpack the VD texture that is desired from the acquired packed VD texture. Then, the display information generation unit 414 may map the unpacked VD texture on the 3D object. Then, the display information generation unit 414 may generate the display image using the 3D data (mesh on which the VD texture is mapped).

Furthermore, Method 1-4 may be applied in a case where Method 1 is applied and a packed VD texture is applied as a component, and the file processing unit 412 may further store a camera parameter and packing metadata corresponding to the packed VD texture in the buffer corresponding to the packed VD texture. In addition, the display information generation unit 414 may further acquire the camera parameter and the packing metadata corresponding to the packed VD texture from the buffer on the basis of the component index. Then, the display information generation unit 414 may unpack the VD texture that is desired from the packed VD texture on the basis of the acquired packing metadata. Then, the display information generation unit 414 may map the VD texture on the 3D object using the acquired camera parameter.

Furthermore, Method 1-4-1 may be applied in a case where Method 1-4 is applied, and the file processing unit 412 may store the camera parameter and the packing metadata of each of the VD textures packed in the packed VD texture in the buffer corresponding to the each of the VD textures on the basis of the VD texture index. In addition, the display information generation unit 414 may further acquire the camera parameter and the packing metadata corresponding to the VD texture that is desired from the buffer on the basis of the VD texture index. Then, the display information generation unit 414 may unpack the VD texture that is desired from the packed VD texture on the basis of the acquired packing metadata. Then, the display information generation unit 414 may map the VD texture on the 3D object using the acquired camera parameter. Note that the VD texture index is set to the camera parameter and the packing metadata for each of the VD textures in the extension for the 3D object video described above, and has a different value for each of the corresponding VD textures.

Furthermore, Method 1-4-2 may be applied in a case where Method 1-4 is applied, and the file processing unit 412 may store each of fields of the camera parameter and the packing metadata in the buffer corresponding to the each of the fields on the basis of a field index. In addition, the display information generation unit 414 may further acquire each of fields of the camera parameter and the packing metadata corresponding to the VD texture that is desired from the buffer on the basis of the field index. Then, the display information generation unit 414 may unpack the VD texture that is desired from the packed VD texture on the basis of the acquired packing metadata. In addition, the display information generation unit 414 may map the VD texture on the 3D object using the acquired camera parameter. Note that the field index is set to the fields of the camera parameter and the packing metadata in the extension for the 3D object video described above, and has a different value for each of the fields.

In addition, Method 1-2 may be applied in a case where Method 1 is applied, and the video component may be a geometry map in which geometry of a point cloud is packed, an attribute map in which attributes of the point cloud are packed, and an occupancy map corresponding to the geometry map and the attribute map. Furthermore, the file processing unit 412 may store the geometry map, the attribute map, and the occupancy map in the buffer corresponding to each of the geometry map, the attribute map, and the occupancy map on the basis of the component index. In addition, the display information generation unit 414 may acquire the geometry map, the attribute map, and the occupancy map from the buffer on the basis of the component index. Then, the display information generation unit 414 may reconstruct the point cloud using the acquired geometry map, attribute map, and occupancy map. Then, the display information generation unit 414 may generate a display image using the reconstructed point cloud.

Of course, the other present technologies described above may be applied in <3. Scene description corresponding to a plurality of video components>. In addition, a plurality of the present technologies may be appropriately combined and applied.

With such a configuration, the client device 400 can store a plurality of video components simultaneously available for one object in different buffers on the basis of the scene description. Therefore, the client device 400 can simultaneously use a plurality of video components for one object by using the scene description.

<Flow of Reproduction Processing>

Figure 37:
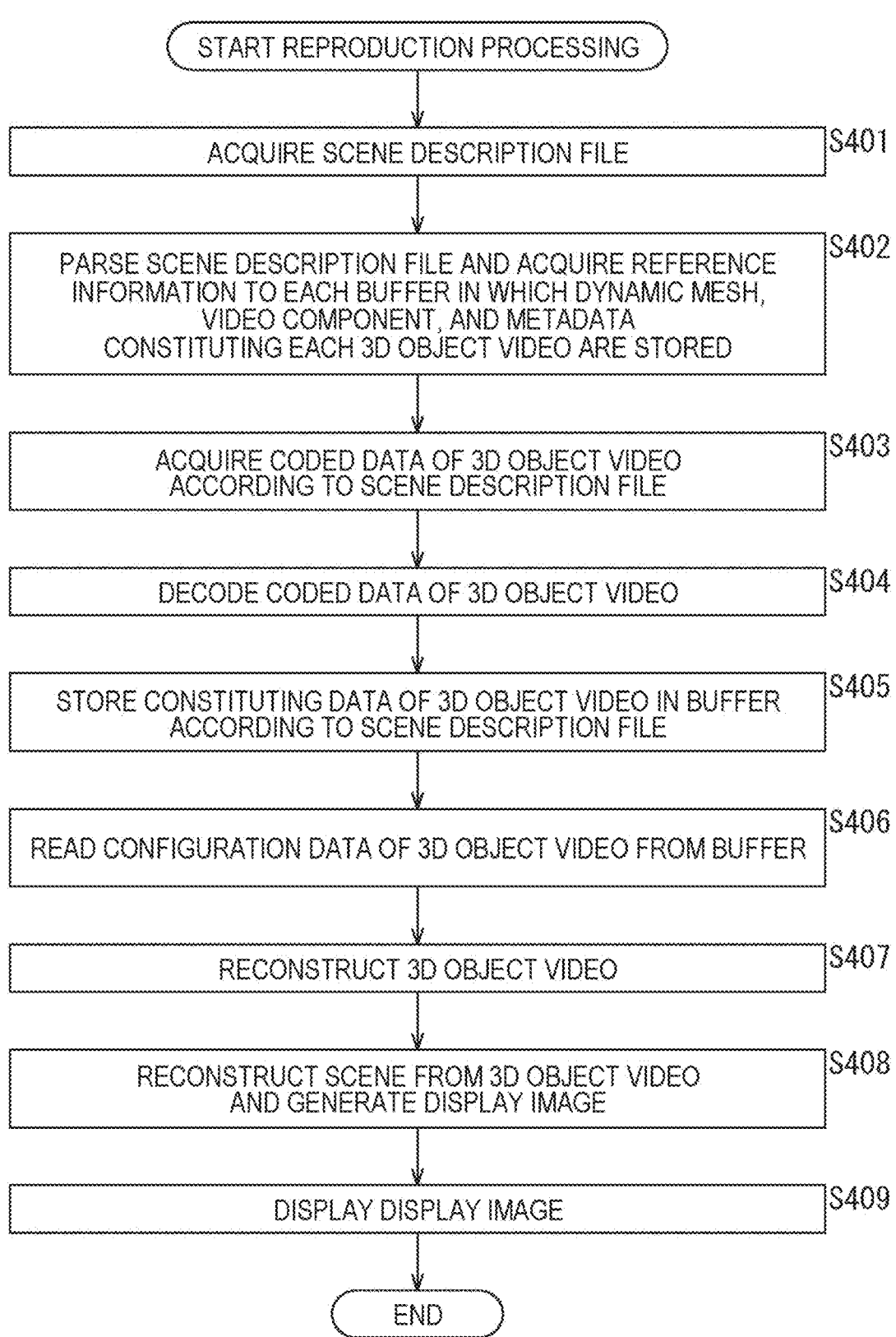
FIG. 37 is a flowchart illustrating an example of a flow of reproduction processing.

An example of a flow of the reproduction processing executed by the client device 400 having such a configuration by applying the above-described Method 1 will be described with reference to a flowchart of FIG. 37.

When the reproduction processing is started, the file acquisition unit 411 of the client device 400 acquires the scene description file in step S401.

In step S402, the display information generation unit 414 parses the scene description file and acquires reference information to a buffer in which each piece of data (for example, each video component) constituting the 3D object video is stored.

In step S403, the display information generation unit 414 controls the file processing unit 412 according to the scene description file to acquire the coded data of the 3D object video. The file processing unit 412 controls the file acquisition unit 411 under the control of the display information generation unit 414 to acquire the coded data of the 3D object video. Under the control of the file processing unit 412, the file acquisition unit 411 acquires the coded data of the 3D object video stored in the content file outside the client device 400, in the local storage, or the like.

In step S404, the decoding unit 413 decodes the coded data of the 3D object video under the control of the file processing unit 412.

In step S405, the file processing unit 412 controls the decoding unit 413 to store the data (data constituting the 3D object video) obtained by the decoding in step S404 in a buffer (corresponding to the buffer 54 in FIG. 7) (not illustrated) according to the scene description. Under the control of the file processing unit 412, the decoding unit 413 stores the data (data constituting the 3D object video) obtained by the decoding in step S404 in a buffer associated with the data in the scene description. For example, the file processing unit 412 (the decoding unit 413 controlled by the file processing unit 412) may store each video component included in the 3D object video in a buffer corresponding to the video component on the basis of the component index by applying Method 1.

In step S406, the display information generation unit 414 reads (acquires) configuration data (video components and the like) of the 3D object video from the buffer according to the scene description.

In step S407, the display information generation unit 414 reconstructs the 3D object video using the configuration data (video component or the like).

In step S408, the display information generation unit 414 reconstructs a scene from the 3D object video according to the scene description, and generates a display image.

For example, the display information generation unit 414 may apply Method 1 and acquire the video component from the buffer on the basis of the component index in step S406. In addition, the display information generation unit 414 may apply Method 1 and generate the display image using the acquired video component in steps S407 and S408.

In step S409, the display unit 415 displays the display image.

When the processing in step S409 ends, the reproduction processing ends.

By executing the reproduction processing in this manner, the client device 400 can store a plurality of video components that can be simultaneously used for one object in different buffers on the basis of the scene description. Therefore, the client device 400 can simultaneously use a plurality of video components for one object by using the scene description.

Note that Method 1-1 may be applied, and the video component may be a VD texture that is a captured image obtained by capturing the 3D object from a predetermined viewpoint. Then, in step S405, the file processing unit 412 (the decoding unit 413 controlled by the file processing unit 412) may store a plurality of the VD textures having the viewpoints different from each other in the buffer corresponding to each of the VD textures on the basis of the component index. In addition, in step S406, the display information generation unit 414 may acquire a desired VD texture from the buffer on the basis of the component index. Then, in step S407, the display information generation unit 414 may map the acquired VD texture on the 3D object (mesh). Then, in step S408, the display information generation unit 414 may generate the display image using the 3D data (mesh on which the VD texture is mapped).

Furthermore, Method 1-3 may be applied in a case where Method 1-1 is applied, and in step S405, the file processing unit 412 (the decoding unit 413 controlled by the file processing unit 412) may further store the camera parameter corresponding to the VD texture in a buffer corresponding to the VD texture. In addition, in step S406, the display information generation unit 414 may further acquire the camera parameter corresponding to the desired VD texture from the buffer on the basis of the component index. Then, in step S407, the display information generation unit 414 may map the VD texture on the 3D object using the acquired camera parameter.

Furthermore, Method 1-3-1 may be applied in a case where Method 1-3 is applied, and in step S405, the file processing unit 412 (the decoding unit 413 controlled by the file processing unit 412) may store each of fields of the camera parameter in the buffer corresponding to the each of the fields on the basis of the field index. In addition, in step S406, the display information generation unit 414 may further acquire each of the fields of the camera parameter corresponding to the VD texture that is desired from the buffer on the basis of the field index. Then, in step S407, the display information generation unit 414 may map the VD texture on the 3D object using the acquired camera parameter. Note that the field index is set to the fields of the camera parameter in the extension for the 3D object video described above, and has a different value for each of the fields.

In addition, Method 1-1 may be applied, and the video component may be a packed VD texture in which a plurality of VD textures, which are captured images obtained by capturing the 3D object from a predetermined viewpoint, is packed. Furthermore, in step S405, the file processing unit 412 (the decoding unit 413 controlled by the file processing unit 412) may store the packed VD texture in the buffer corresponding to the packed VD texture on the basis of the component index. In addition, in step S406, the display information generation unit 414 may acquire the packed VD texture from the buffer on the basis of the component index. Then, the display information generation unit 414 may unpack the VD texture that is desired from the acquired packed VD texture. Then, in step S407, the display information generation unit 414 may map the unpacked VD texture onto the 3D object. Then, in step S408, the display information generation unit 414 may generate the display image using the 3D data (mesh on which the VD texture is mapped).

Furthermore, Method 1-4 may be applied in a case where Method 1-1 is applied, and in step S405, the file processing unit 412 (the decoding unit 413 controlled by the file processing unit 412) may further store a camera parameter and packing metadata corresponding to the packed VD texture in the buffer corresponding to the packed VD texture. In addition, in step S406, the display information generation unit 414 may further acquire the camera parameter and the packing metadata corresponding to the packed VD texture from the buffer on the basis of the component index. Then, the display information generation unit 414 may unpack the VD texture that is desired from the packed VD texture on the basis of the acquired packing metadata. Then, in step S407, the display information generation unit 414 may map the VD texture on the 3D object using the acquired camera parameter.

Furthermore, Method 1-4-1 may be applied in a case where Method 1-4 is applied, and in step S405, the file processing unit 412 (the decoding unit 413 controlled by the file processing unit 412) may store the camera parameter and the packing metadata of each of the VD textures packed in the packed VD texture in the buffer corresponding to the each of the VD textures on the basis of the VD texture index. In addition, in step S406, the display information generation unit 414 may further acquire the camera parameter and the packing metadata corresponding to the VD texture that is desired from the buffer on the basis of the VD texture index. Then, the display information generation unit 414 may unpack the VD texture that is desired from the packed VD texture on the basis of the acquired packing metadata. Then, in step S407, the display information generation unit 414 may map the VD texture on the 3D object using the acquired camera parameter. Note that the VD texture index is set to the camera parameter and the packing metadata for each of the VD textures in the extension for the 3D object video described above, and has a different value for each of the corresponding VD textures.

Furthermore, Method 1-4-2 may be applied in a case where Method 1-4 is applied, and in step S405, the file processing unit 412 (the decoding unit 413 controlled by the file processing unit 412) may store each of fields of the camera parameter and the packing metadata in the buffer corresponding to the each of the fields on the basis of a field index. In addition, in step S406, the display information generation unit 414 may further acquire each of fields of the camera parameter and the packing metadata corresponding to the VD texture that is desired from the buffer on the basis of the field index. Then, the display information generation unit 414 may unpack the VD texture that is desired from the packed VD texture on the basis of the acquired packing metadata. Then, in step S407, the display information generation unit 414 may map the VD texture on the 3D object using the acquired camera parameter. Note that the field index is set to the fields of the camera parameter and the packing metadata in the extension for the 3D object video described above, and has a different value for each of the fields.

In addition, Method 1-2 may be applied, and the video component may be a geometry map in which geometry of a point cloud is packed, an attribute map in which attributes of the point cloud are packed, and an occupancy map corresponding to the geometry map and the attribute map. Furthermore, in step S405, the file processing unit 412 (the decoding unit 413 controlled by the file processing unit 412) may store the geometry map, the attribute map, and the occupancy map in the buffer corresponding to each of the geometry map, the attribute map, and the occupancy map on the basis of the component index. In addition, in step S406, the display information generation unit 414 may acquire the geometry map, the attribute map, and the occupancy map from the buffer on the basis of the component index. Then, in step S407, the display information generation unit 414 may reconstruct the point cloud using the acquired geometry map, attribute map, and occupancy map. Then, in step S408, the display information generation unit 414 may generate a display image using the reconstructed point cloud.

Of course, the other present technologies described above may be applied in <3. Scene description corresponding to a plurality of video components>. In addition, a plurality of the present technologies may be appropriately combined and applied.

6. APPENDIX

<Combination>

Each example of the present technology described above may be applied in appropriate combination with other examples as long as there is no contradiction. In addition, each example of the present technology described above may be applied in combination with another technology other than the above-described technology.

<Computer>

The above-described series of processing can be executed by hardware or software. In a case where the series of processing is executed by software, a program forming the software is installed in a computer. Here, examples of the computer include a computer built in dedicated hardware, a general-purpose personal computer that can execute various functions by being installed with various programs and the like, for example.

Figure 38:
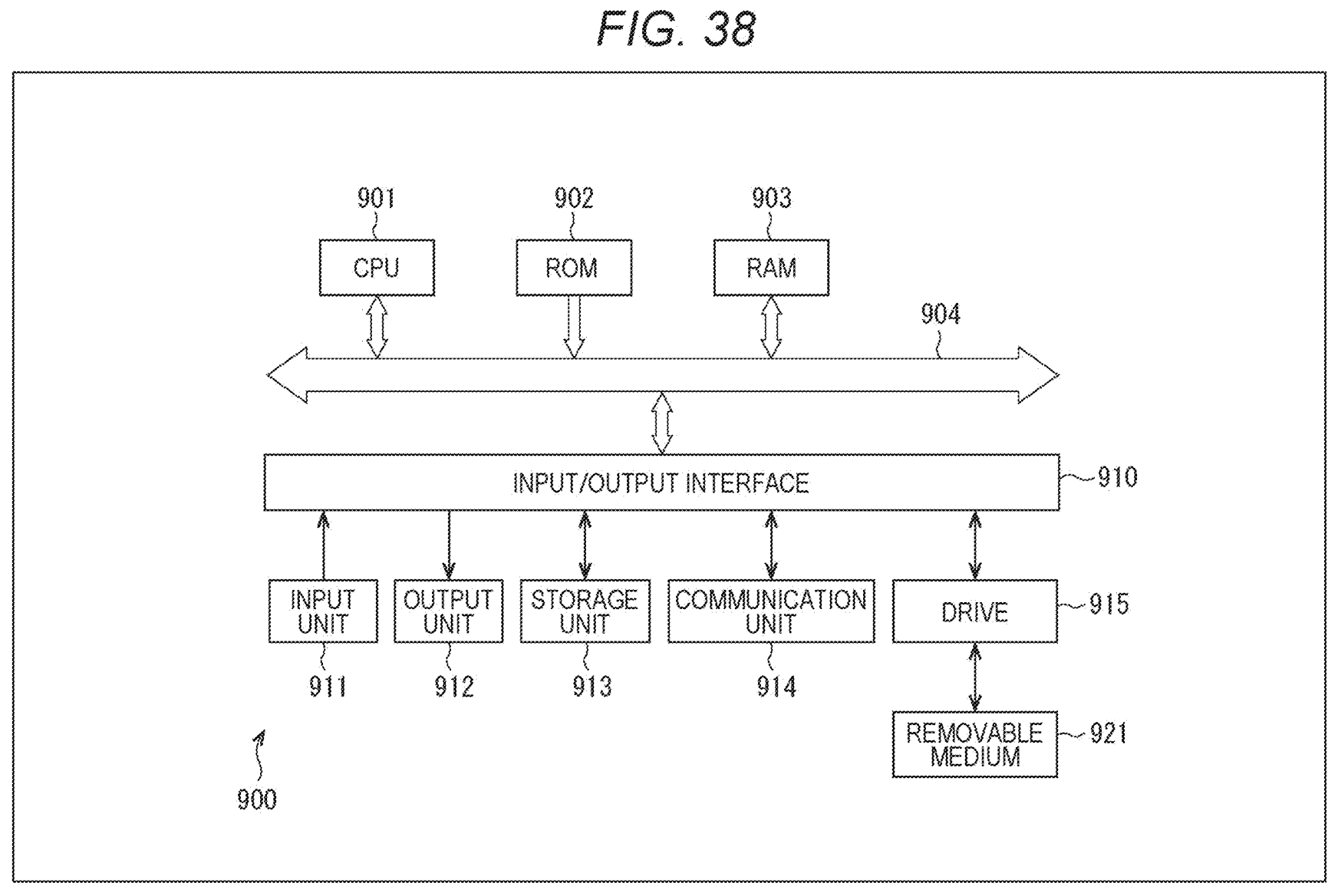

FIG. 38 is a block diagram illustrating a configuration example of hardware of a computer that executes the above-described series of processing by a program.

In a computer 900 illustrated in FIG. 38, a central processing unit (CPU) 901, a read only memory (ROM) 902, and a random access memory (RAM) 903 are mutually connected via a bus 904.

An input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch panel, an input terminal and the like. The output unit 912 includes, for example, a display, a speaker, an output terminal and the like. The storage unit 913 includes, for example, a hard disk, a RAM disk, a nonvolatile memory and the like. The communication unit 914 includes, for example, a network interface. The drive 915 drives a removable medium 921 such as a magnetic disk, an optical disk, a magneto-optical disk, or a semiconductor memory.

In the computer configured as described above, the series of processing described above are performed, for example, by the CPU 901 loading a program stored in the storage unit 913 into the RAM 903 via the input/output interface 910 and the bus 904, and executing the program. The RAM 903 also appropriately stores data and the like necessary for the CPU 901 to execute various processes.

The program executed by the computer can be applied by being recorded on, for example, the removable medium 921 as a package medium or the like. In this case, the program can be installed in the storage unit 913 via the input/output interface 910 by attaching the removable medium 921 to the drive 915.

Furthermore, this program can also be provided via a wired or wireless transmission medium such as a local area network, the Internet, or digital satellite broadcasting. In this case, the program can be received by the communication unit 914 and installed in the storage unit 913.

In addition, this program can be installed in the ROM 902 or the storage unit 913 in advance.

<Object to which the Present Technology is Applicable>

The present technology can be applied to any encoding/decoding method.

Furthermore, the present technology can be applied to any configuration. For example, the present technology can be applied to various electronic devices.

Furthermore, for example, the present technology can also be implemented as a partial configuration of a device, such as a processor (for example, a video processor) as a system large scale integration (LSI) and the like, a module (for example, a video module) using a plurality of the processors and the like, a unit (for example, a video unit) using a plurality of the modules and the like, or a set (for example, a video set) obtained by further adding other functions to the unit.

Furthermore, for example, the present technology can also be applied to a network system including a plurality of devices. For example, the present technology may be implemented as cloud computing in which a plurality of devices shares and processes in cooperation via a network. For example, the present technology may be implemented in a cloud service that provides a service regarding an image (moving image) to any terminal such as a computer, an audio visual (AV) device, a portable information processing terminal, or an Internet of Things (IOT) device.

Note that, in the present specification, a system means a set of a plurality of components (devices, modules (parts) and the like), and it does not matter whether or not all the components are in the same housing. Therefore, a plurality of devices housed in different housings and connected via a network, and one device in which a plurality of modules is housed in one housing are both systems.

<Field and Application to which Present Technology is Applicable>

The system, device, processing unit and the like to which the present technology is applied can be used in any field such as traffic, medical care, crime prevention, agriculture, livestock industry, mining, beauty care, factory, household appliance, weather, and natural surveillance, for example. Furthermore, an application thereof is optional.

For example, the present technology can be applied to systems and devices used for providing content for appreciation and the like. Furthermore, for example, the present technology can also be applied to systems and devices used for traffic, such as traffic condition management and automated driving control. Moreover, for example, the present technology can also be applied to systems and devices used for security. Furthermore, for example, the present technology can be applied to systems and devices used for automatic control of a machine and the like. Moreover, for example, the present technology can also be applied to systems and devices provided for use in agriculture and livestock industry. Furthermore, the present technology can also be applied to systems and devices that monitor, for example, the status of nature such as a volcano, a forest, and the ocean, wildlife and the like. Moreover, for example, the present technology can also be applied to systems and devices used for sports.

<Others>

Note that, in the present specification, a "flag" is information for identifying a plurality of states, and includes not only information used for identifying two states of true (1) or false (0), but also information that can identify three or more states. Therefore, a value that may be taken by the "flag" may be, for example, a binary of 1/0 or a ternary or more. That is, the number of bits forming this "flag" is any number, and may be one bit or a plurality of bits. Furthermore, identification information (including the flag) is assumed to include not only identification information thereof in a bit stream but also difference information of the identification information with respect to certain reference information in the bit stream, and thus, in the present specification, the "flag" and "identification information" include not only the information thereof but also the difference information with respect to the reference information.

In addition, various types of information (such as metadata) regarding coded data (bit stream) may be transmitted or recorded in any form as long as this is associated with the coded data. Herein, the term "associate" is intended to mean to make, when processing one data, the other data available (linkable), for example. That is, the data associated with each other may be collected as one data or may be made individual data. For example, information associated with the coded data (image) may be transmitted on a transmission path different from that of the coded data (image). In addition, for example, the information associated with the coded data (image) may be recorded in a recording medium different from that of the coded data (image) (or another recording area of the same recording medium). Note that, this "association" may be of not entire data but a part of data. For example, an image and information corresponding to the image may be associated with each other in any unit such as a plurality of frames, one frame, or a part within a frame.

Note that, in the present specification, terms such as "synthesize", "multiplex", "add", "integrate", "include", "store", "put in", "introduce", "insert" and the like mean, for example, to combine a plurality of objects into one, such as to combine coded data and metadata into one data, and mean one method of "associating" described above.

Furthermore, the embodiments of the present technology are not limited to the above-described embodiments, and various modifications are possible without departing from the scope of the present technology.

For example, a configuration described as one device (or processing unit) may be divided to form a plurality of devices (or processing units). Conversely, configurations described above as a plurality of devices (or processing units) may be collectively configured as one device (or processing unit). Furthermore, it goes without saying that a configuration other than the above-described configurations may be added to the configuration of each device (or each processing unit). Moreover, when the configuration and operation as the entire system are substantially the same, a part of the configuration of a certain device (or processing unit) may be included in the configuration of another device (or another processing unit).

In addition, for example, the above-described program may be executed in any device. In this case, the device is only required to have a necessary function (functional block and the like) and obtain necessary information.

In addition, for example, each step of one flowchart may be executed by one device, or may be shared and executed by a plurality of devices. Moreover, in a case where a plurality of processes is included in one step, the plurality of processes may be executed by one device, or may be shared and executed by a plurality of devices. In other words, a plurality of processes included in one step can also be executed as processes of a plurality of steps. Conversely, the processes described as the plurality of the steps can also be collectively executed as one step.

Furthermore, for example, in a program executed by the computer, processing of steps describing the program may be executed in a time-series order in the order described in the present specification, or may be executed in parallel or individually at a required timing such as when a call is made. That is, as long as there is no contradiction, the processing of each step may be executed in an order different from the above-described order. Moreover, the processes in the steps describing the program may be executed in parallel with processes of another program, or may be executed in combination with processes of the other program.

Furthermore, for example, a plurality of technologies regarding the present technology can be implemented independently as a single entity as long as there is no contradiction. It goes without saying that any plurality of present technologies can be implemented in combination. For example, a part or all of the present technologies described in any of the embodiments can be implemented in combination with a part or all of the present technologies described in other embodiments. Furthermore, a part or all of any of the above-described present technologies can be implemented together with another technology that is not described above.

Note that the present technology may also have the following configurations.

(1) An information processing device, including:
a file processing unit that stores a video component included in a 3D object video in a buffer corresponding to the video component on the basis of a component index; and
a display image generation unit that acquires the video component from the buffer on the basis of the component index, and generates a display image using the acquired video component, in which
a plurality of the video components is simultaneously usable in one 3D object, and
the component index is set to the video component included in the 3D object video in an extension for the 3D object video defined in a material layer of a scene description, and has a different value for each of the video components.

(2) The information processing device according to (1), in which the video component is a VD texture that is a captured image obtained by capturing the 3D object from a predetermined viewpoint, the file processing unit stores a plurality of the VD textures having the viewpoints different from each other in the buffer corresponding to each of the VD textures on the basis of the component index, and the display image generation unit acquires the VD texture that is desired from the buffer on the basis of the component index, maps the acquired VD texture on the 3D object, and generates the display image.

(3) The information processing device according to (2), in which the file processing unit further stores a camera parameter corresponding to the VD texture in the buffer corresponding to the VD texture, and the display image generation unit further acquires the camera parameter corresponding to the VD texture that is desired from the buffer on the basis of the component index, and maps the VD texture on the 3D object using the acquired camera parameter.

(4) The information processing device according to (3), in which the file processing unit stores each of fields of the camera parameter in the buffer corresponding to the each of the fields on the basis of a field index, the display image generation unit further acquires each of the fields of the camera parameter corresponding to the VD texture that is desired from the buffer on the basis of the field index, and maps the VD texture on the 3D object using the acquired camera parameter, and the field index is set to the fields of the camera parameter in the extension, and has a different value for each of the fields.

(5) The information processing device according to any one of (1) to (4), in which the video component is a packed VD texture in which a plurality of VD textures, which are captured images obtained by capturing the 3D object from a predetermined viewpoint, is packed, the file processing unit stores the packed VD texture in the buffer corresponding to the packed VD texture on the basis of the component index, and the display image generation unit acquires the packed VD texture from the buffer on the basis of the component index, unpacks the VD texture that is desired from the acquired packed VD texture, maps the unpacked VD texture on the 3D object, and generates the display image.

(6) The information processing device according to (5), in which the file processing unit further stores a camera parameter and packing metadata corresponding to the packed VD texture in the buffer corresponding to the packed VD texture, and the display image generation unit further acquires the camera parameter and the packing metadata corresponding to the packed VD texture from the buffer on the basis of the component index, unpacks the VD texture that is desired from the packed VD texture on the basis of the acquired packing metadata, and maps the VD texture on the 3D object using the acquired camera parameter.

(7) The information processing device according to (6), in which the file processing unit stores the camera parameter and the packing metadata of each of the VD textures packed in the packed VD texture in the buffer corresponding to the each of the VD textures on the basis of the VD texture index, the display image generation unit further acquires the camera parameter and the packing metadata corresponding to the VD texture that is desired from the buffer on the basis of the VD texture index, unpacks the VD texture that is desired from the packed VD texture on the basis of the acquired packing metadata, and maps the VD texture on the 3D object using the acquired camera parameter, and the VD texture index is set to the camera parameter and the packing metadata for each of the VD textures in the extension, and has a different value for each of the corresponding VD textures.

(8) The information processing device according to (6), in which the file processing unit stores each of fields of the camera parameter and the packing metadata in the buffer corresponding to the each of the fields on the basis of a field index, the display image generation unit further acquires each of fields of the camera parameter and the packing metadata corresponding to the VD texture that is desired from the buffer on the basis of the field index, unpacks the VD texture that is desired from the packed VD texture on the basis of the acquired packing metadata, and maps the VD texture on the 3D object using the acquired camera parameter, and the field index is set to the fields of the camera parameter and the packing metadata in the extension, and has a different value for each of the fields.

(9) The information processing device according to (1), in which the video component is a geometry map in which geometry of a point cloud is packed, an attribute map in which attributes of the point cloud are packed, and an occupancy map corresponding to the geometry map and the attribute map, the file processing unit stores the geometry map, the attribute map, and the occupancy map in the buffer corresponding to each of the geometry map, the attribute map, and the occupancy map on the basis of the component index, and the display image generation unit acquires the geometry map, the attribute map, and the occupancy map from the buffer on the basis of the component index, reconstructs the point cloud using the acquired geometry map, the acquired attribute map, and the acquired occupancy map, and generates the display image.

(10) An information processing method, including:

storing a video component included in a 3D object video in a buffer corresponding to the video component on the basis of a component index; and acquiring the video component from the buffer on the basis of the component index, and generating a display image using the acquired video component, in which a plurality of the video components is simultaneously usable in one 3D object, and the component index is set to the video component included in the 3D object video in an extension for the 3D object video defined in a material layer of a scene description, and has a different value for each of the video components.

(11) An information processing device, including:

a file generation unit that generates a scene description file and sets a component index to a video component included in a 3D object video in an extension for the 3D object video defined in a material layer of the scene description file, the component index having a different value for each of the video components, in which a plurality of the video components is simultaneously usable in one 3D object.

(12) The information processing device according to (11), in which the video component is a VD texture that is a captured image obtained by capturing the 3D object from a predetermined viewpoint, and the file generation unit sets the component index to each of a plurality of the VD textures included in the 3D object video in the extension.

(13) The information processing device according to (12), in which the file generation unit further stores a camera parameter corresponding to the VD texture in the extension.

(14) The information processing device according to (13), in which the file generation unit further sets a field index to each of fields of the camera parameter in the extension, the field index having a different value for each of the fields.

(15) The information processing device according to any one of (11) to (14), in which the video component is a packed VD texture in which a plurality of VD textures, which are captured images obtained by capturing the 3D object from a predetermined viewpoint, is packed, and the file generation unit sets the component index to the packed VD texture in the extension.

(16) The information processing device according to (15), in which the file generation unit further stores a camera parameter and packing metadata corresponding to the packed VD texture in the extension.

(17) The information processing device according to (16), in which the file generation unit further sets a VD texture index to the camera parameter and the packing metadata for each of the VD textures packed in the packed VD texture in the extension, the VD texture index having a different value for each of the corresponding VD textures.

(18) The information processing device according to (16), in which the file generation unit further sets a field index to each of fields of the camera parameter and the packing metadata in the extension, the field index having a different value for each of the fields.

(19) The information processing device according to (11), in which the video component is a geometry map in which geometry of a point cloud is packed, an attribute map in which attributes of the point cloud are packed, and an occupancy map corresponding to the geometry map and the attribute map, and the file generation unit sets the component index having a different value to each of the geometry map, the attribute map, and the occupancy map in the extension.

(20) An information processing method, including:

generating a scene description file and setting a component index to a video component included in a 3D object video in an extension for the 3D object video defined in a material layer of the scene description file, the component index having a different value for each of the video components, in which a plurality of the video components is simultaneously usable in one 3D object.

REFERENCE SIGNS LIST

300 File generation device
301 Control unit
302 File generation processing unit
311 Input unit
312 Preprocessing unit
313 Encoding unit
314 File generation unit
315 Recording unit
316 Output unit
400 Client device
401 Control unit
402 Client processing unit
411 File acquisition unit
412 File processing unit
413 Decoding unit
414 Display information generation unit
415 Display unit
416 Display control unit

The invention claimed is:

1. An information processing device, comprising:

processing circuitry configured to:

store video components included in a 3D object video in a buffer corresponding to the video components on a basis of a component index;

acquire the video components from the buffer on a basis of the component index; and generate a display image using the acquired video components, wherein a plurality of the video components is simultaneously usable in one 3D object, and the component index is set to the video components included in the 3D object video in an extension for the 3D object video defined in a material layer of a scene description and has a different value for each of the video components.

2. The information processing device according to claim 1, wherein the video components each include viewpoint-dependent (VD) texture that is a captured image obtained by capturing the 3D object from a predetermined viewpoint, and the processing circuitry is configured to store a plurality of the VD textures having the viewpoints different from each other in the buffer corresponding to each of the VD textures on a basis of the component index, acquire a VD texture that is desired from the buffer on a basis of the component index, and map the acquired VD texture on the 3D object.

3. The information processing device according to claim 2, wherein the processing circuitry is configured to:

store a camera parameter corresponding to at least one of the VD textures in the buffer corresponding to the VD textures, acquire the camera parameter corresponding to the VD texture that is desired from the buffer on a basis of the component index, and map the acquired VD texture on the 3D object using the acquired camera parameter.

4. The information processing device according to claim 3, wherein the processing circuitry is configured to store each of fields of the camera parameter in the buffer corresponding to the each of the fields on a basis of a field index, acquire each of the fields of the camera parameter corresponding to the VD texture that is desired from the buffer on a basis of the field index, and map the acquired VD texture on the 3D object using the acquired camera parameter, and the field index is set to the fields of the camera parameter in the extension and has a different value for each of the fields.

5. The information processing device according to claim 1, wherein the video components include a packed viewpoint-dependent (VD) texture in which a plurality of VD textures, which are captured images obtained by capturing the 3D object from a predetermined viewpoint, is packed, and the processing circuitry is configured to store the packed VD texture in the buffer corresponding to the packed VD texture on a basis of the component index, acquire the packed VD texture from the buffer on a basis of the component index, unpack a VD texture that is desired from the acquired packed VD texture, and map the unpacked VD texture on the 3D object.

6. The information processing device according to claim 5, wherein the processing circuitry is configured to:

store a camera parameter and packing metadata corresponding to the packed VD texture in the buffer corresponding to the packed VD texture, acquire the camera parameter and the packing metadata corresponding to the packed VD texture from the buffer on a basis of the component index, unpack the VD texture that is desired from the packed VD texture on a basis of the acquired packing metadata, and map the unpacked VD texture on the 3D object using the acquired camera parameter.

7. The information processing device according to claim 6, wherein the processing circuitry is configured to:

store the camera parameter and the packing metadata of each of the VD textures packed in the packed VD texture in the buffer corresponding to the each of the VD textures on a basis of a VD texture index, acquire the camera parameter and the packing metadata corresponding to the VD texture that is desired from the buffer on a basis of the VD texture index, unpack the VD texture that is desired from the packed VD texture on a basis of the acquired packing metadata, and map the unpacked VD texture on the 3D object using the acquired camera parameter, and the VD texture index is set to the camera parameter and the packing metadata for each of the VD textures in the extension and has a different value for each of the corresponding VD textures.

8. The information processing device according to claim 6, wherein the processing circuitry is configured to:

store each of fields of the camera parameter and the packing metadata in the buffer corresponding to the each of the fields on a basis of a field index, acquire each of fields of the camera parameter and the packing metadata corresponding to the VD texture that is desired from the buffer on a basis of the field index, unpack the VD texture that is desired from the packed VD texture on a basis of the acquired packing metadata, and map the unpacked VD texture on the 3D object using the acquired camera parameter, and the field index is set to the fields of the camera parameter and the packing metadata in the extension and has a different value for each of the fields.

9. The information processing device according to claim 1, wherein the video components include a geometry map in which geometry of a point cloud is packed, an attribute map in which attributes of the point cloud are packed, and an occupancy map corresponding to the geometry map and the attribute map, and the processing circuitry is configured to store the geometry map, the attribute map, and the occupancy map in the buffer corresponding to each of the geometry map, the attribute map, and the occupancy map on a basis of the component index, acquire the geometry map, the attribute map, and the occupancy map from the buffer on a basis of the component index, and reconstruct the point cloud using the acquired geometry map, the acquired attribute map, and the acquired occupancy map.

10. An information processing method, comprising:

storing video components included in a 3D object video in a buffer corresponding to the video components on a basis of a component index;

acquiring the video components from the buffer on a basis of the component index; and generating a display image using the acquired video components, wherein a plurality of the video components is simultaneously usable in one 3D object, and the component index is set to the video components included in the 3D object video in an extension for the 3D object video defined in a material layer of a scene description and has a different value for each of the video components.

11. An information processing device, comprising:

processing circuitry configured to generate a scene description file; and set a component index to video components included in a 3D object video in an extension for the 3D object video defined in a material layer of the scene description file, the component index having a different value for each of the video components, wherein a plurality of the video components is simultaneously usable in one 3D object.

12. The information processing device according to claim 11, wherein the video components each include a viewpoint-dependent (VD) texture that is a captured image obtained by capturing the 3D object from a predetermined viewpoint, and the processing circuitry is configured to set the component index to each of a plurality of the VD textures included in the 3D object video in the extension.

13. The information processing device according to claim 12, wherein the processing circuitry is configured to store a camera parameter corresponding to at least one of the VD textures in the extension.

14. The information processing device according to claim 13, wherein the processing circuitry is configured to set a field index to each of fields of the camera parameter in the extension, the field index having a different value for each of the fields.

15. The information processing device according to claim 11, wherein the video components include a packed viewpoint-dependent (VD) texture in which a plurality of VD textures, which are captured images obtained by capturing the 3D object from a predetermined viewpoint, is packed, and the processing circuitry is configured to set the component index to the packed VD texture in the extension.

16. The information processing device according to claim 15, wherein the processing circuitry is configured to store a camera parameter and packing metadata corresponding to the packed VD texture in the extension.

17. The information processing device according to claim 16, wherein the processing circuitry is configured to set a VD texture index to the camera parameter and the packing metadata for each of the VD textures packed in the packed VD texture in the extension, the VD texture index having a different value for each of the corresponding VD textures.

18. The information processing device according to claim 16, wherein the processing circuitry is configured to set a field index to each of fields of the camera parameter and the packing metadata in the extension, the field index having a different value for each of the fields.

19. The information processing device according to claim 11, wherein the video components include a geometry map in which geometry of a point cloud is packed, an attribute map in which attributes of the point cloud are packed, and an occupancy map corresponding to the geometry map and the attribute map, and the processing circuitry is configured to set the component index having a different value to each of the geometry map, the attribute map, and the occupancy map in the extension.

20. An information processing method, comprising:

generating a scene description file; and setting a component index to video components included in a 3D object video in an extension for the 3D object video defined in a material layer of the scene description file, the component index having a different value for each of the video components, wherein a plurality of the video components is simultaneously usable in one 3D object.

\* \* \* \* \*